United States Patent
Yamamoto et al.

(10) Patent No.: US 12,012,905 B2
(45) Date of Patent: Jun. 18, 2024

(54) CONTROL DEVICE, GAS TURBINE, CONTROL METHOD, AND PROGRAM

(71) Applicant: Mitsubishi Hitachi Power Systems, Ltd., Kanagawa (JP)

(72) Inventors: Keisuke Yamamoto, Tokyo (JP); Kazushige Takaki, Tokyo (JP); Makoto Kishi, Tokyo (JP); Shinya Uchida, Yokohama (JP); Hisashi Nakahara, Yokohama (JP); Hikaru Katano, Yokohama (JP); Yoshikazu Ui, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 833 days.

(21) Appl. No.: 16/766,421

(22) PCT Filed: Nov. 30, 2018

(86) PCT No.: PCT/JP2018/044184
§ 371 (c)(1),
(2) Date: May 22, 2020

(87) PCT Pub. No.: WO2019/130976
PCT Pub. Date: Jul. 4, 2019

(65) Prior Publication Data
US 2021/0148291 A1    May 20, 2021

(30) Foreign Application Priority Data
Dec. 28, 2017  (JP) ................. 2017-253217

(51) Int. Cl.
*F02C 9/54*    (2006.01)
(52) U.S. Cl.
CPC ............ *F02C 9/54* (2013.01); *F05D 2220/32* (2013.01); *F05D 2270/05* (2013.01)

(58) Field of Classification Search
CPC ...... F02C 9/28; F02C 9/52; F02C 9/54; F02C 9/46; F02C 7/228; F05D 2220/32; F05D 2270/05
See application file for complete search history.

(56) References Cited

U.S. PATENT DOCUMENTS

| | | | |
|---|---|---|---|
| 10,920,676 B2* | 2/2021 | Sorato | F23N 5/003 |
| 2014/0230449 A1* | 8/2014 | Saito | F02C 9/50 |
| | | | 60/734 |

(Continued)

FOREIGN PATENT DOCUMENTS

| | | |
|---|---|---|
| JP | 2002-147253 | 5/2002 |
| JP | 2013-096303 | 5/2013 |

(Continued)

OTHER PUBLICATIONS

International Search Report issued Feb. 26, 2019 in International (PCT) Patent Application No. PCT/JP2018/044184, with English Translation.

(Continued)

*Primary Examiner* — Jason H Duger
(74) *Attorney, Agent, or Firm* — Wenderoth, Lind & Ponack, L.L.P.

(57) ABSTRACT

A control device selects and executes any of normal control of outputting a fuel flow rate command value through feedback control based on a deviation between a target output and an actual output of a gas turbine and load decreasing control of outputting the fuel flow rate command value for reducing an output of the gas turbine to a predetermined target output during a predetermined first time without performing feedback control, and performs control of reducing a flow rate of air flowing into a compressor of the gas turbine such that an air-fuel ratio settles within a predetermined range, in parallel with execution of the load (Continued)

decreasing control when the load decreasing control is selected.

13 Claims, 13 Drawing Sheets

(56) References Cited

U.S. PATENT DOCUMENTS

| | | | |
|---|---|---|---|
| 2015/0354467 A1 | 12/2015 | Kishi et al. | |
| 2016/0010864 A1* | 1/2016 | Abe | F23R 3/32 |
| | | | 60/748 |
| 2016/0326967 A1 | 11/2016 | Yamamoto et al. | |
| 2017/0044997 A1* | 2/2017 | Nakagawa | F02C 7/22 |
| 2017/0292458 A1* | 10/2017 | Nakagawa | F23R 3/34 |
| 2018/0209352 A1 | 7/2018 | Endo et al. | |

FOREIGN PATENT DOCUMENTS

| | | |
|---|---|---|
| JP | 2013-113201 | 6/2013 |
| JP | 2014-159786 | 9/2014 |
| JP | 2015-078670 | 4/2015 |
| JP | 2015-161176 | 9/2015 |
| JP | 2016-037882 | 3/2016 |
| JP | 2016-037883 | 3/2016 |
| JP | 2016-070063 | 5/2016 |
| JP | 2017-106324 A | 6/2017 |

OTHER PUBLICATIONS

Written Opinion issued Feb. 26, 2019 in International (PCT) Patent Application No. PCT/JP2018/044184, with English Translation.

* cited by examiner

CONTROL DEVICE, GAS TURBINE, CONTROL METHOD, AND PROGRAM

TECHNICAL FIELD

The present invention relates to a control device, a gas turbine, a control method, and a program.

Priority is claimed on Japanese Patent Application No. 2017-253217, filed Dec. 28, 2017, the content of which is incorporated herein by reference.

BACKGROUND ART

When an abnormality occurs in a gas turbine power plant, a load may be shut off as a countermeasure. When a load is shut off, a gas turbine stops. In order to supply power from the power plant again, there is a need to restart the gas turbine. For this reason, a power wholesaler may miss an opportunity to make profits out of power generation until the gas turbine is restarted after the load shutoff to be able to supply power again. In respect to this, there is a need for an operation in which operation continues, even when an abnormality occurs, in a state in which a load is decreased without stopping the gas turbine and a rated output is recovered after a countermeasure against the abnormality is completed. If such an operation can be performed, a power wholesaler can avoid missing an opportunity for power generation.

Patent Literature 1 discloses a method for controlling a fuel distribution for a plurality of fuel systems at the time of a load shutoff. According to the control method in Patent Literature 1, it is possible to prevent accidental fire in a combustor at the time of a load shutoff.

CITATION LIST

Patent Literature

Patent Literature 1

Japanese Unexamined Patent Application, First Publication No. 2014-159786

SUMMARY OF INVENTION

Technical Problem

In order to realize the foregoing operation instead of a load shutoff, operation of a gas turbine has to be continued to secure safety or to protect instruments while a load is decreased quickly, for example, at a rate of 800% or more per minute. In order to realize this operation, there are technical problems, such as 1) reduction of an air-suctioning amount of a compressor while avoiding a surge in the compressor, and 2) prevention of accidental fire in a combustor. Until now, a technology for resolving these technical problems has not yet been provided.

The present invention provides a control device, a gas turbine, a control method, and a program capable of resolving the problems described above.

Solution to Problem

According to an aspect of the present invention, a control device is provided including a fuel flow rate command calculation unit configured to select and execute any of normal control of calculating a fuel flow rate command value through feedback control based on a deviation between a target output and an actual output of a gas turbine and load decreasing control of calculating the fuel flow rate command value for reducing an output of the gas turbine to a predetermined target output during a predetermined first time without performing feedback control; and an air suction flow rate control unit configured to perform control of reducing a flow rate of air flowing into a compressor of the gas turbine such that a fuel-air ratio settles within a predetermined range, in parallel with the load decreasing control executed by the fuel flow rate command calculation unit.

According to the aspect of the present invention, when the load decreasing control is selected, the fuel flow rate command calculation unit changes a reduction rate, at which the fuel flow rate command value is reduced to a value corresponding to the target output, in accordance with an atmospheric air temperature.

According to the aspect of the present invention, when the load decreasing control is selected, a difference between the first time taken until the fuel flow rate command value is reduced to a value corresponding to the target output and a second time taken until the flow rate of air flowing into the compressor is reduced to a predetermined target flow rate is equal to or smaller than a predetermined value.

According to the aspect of the present invention, the first time and the second time are within a range of two seconds to five seconds.

According to the aspect of the present invention, when the load decreasing control is selected, the reduction rate of an output of the gas turbine is higher than 100% per minute.

According to the aspect of the present invention, when the load decreasing control is selected, the reduction rate of an output of the gas turbine is within a range of 800% per minute to 2,000% per minute.

According to the aspect of the present invention, when the load decreasing control is selected, the target output of the gas turbine is within a range of 30% to 40% of a rated output of the gas turbine.

According to the aspect of the present invention, the control device further includes a fuel distribution control unit configured to execute stop control of stopping fuel supply from a first nozzle, of a plurality of nozzles provided in a combustor, provided on a side furthest upstream at a timing when the fuel flow rate command value reaches a value corresponding to the target output in a case in which abnormal combustion occurs in the combustor of the gas turbine during the load decreasing control, and to execute distribution switch control of switching a fuel supply distribution ratio between the remaining nozzles excluding the first nozzle to a distribution ratio after the stop control.

According to the aspect of the present invention, the fuel distribution control unit performs correction of compensating for a fuel supply amount which has dropped temporarily due to stop of fuel supply from the first nozzle regarding the fuel supply distribution ratio for the nozzles, of the remaining nozzles excluding the first nozzle, for forming a premixed flame for retaining a premixed combustion flame formed by the combustor.

According to the aspect of the present invention, the control device further includes a second fuel distribution control unit configured to perform correction of a fuel distribution ratio for a second nozzle of the plurality of nozzles provided in the combustor of the gas turbine to avoid a relationship between a combustion load command value corresponding to a load at one time during the load decreasing control and the fuel distribution ratio for the second nozzle at the one time becoming a relationship having a high likelihood of occurrence of combustion vibration regarding the fuel distribution ratio for the second nozzle related to combustion vibration.

According to another aspect of the present invention, a gas turbine is provided including a compressor, a combustor, a turbine, and the control device according to any one of those described above.

According to another aspect of the present invention, a control method is provided including a step of selecting and executing any of normal control of calculating a fuel flow rate command value through feedback control based on a deviation between a target output and an actual output of a gas turbine and load decreasing control of calculating the fuel flow rate command value for reducing an output of the gas turbine to a predetermined target output during a predetermined first time without performing feedback control, and a step of performing control of reducing a flow rate of air flowing into a compressor of the gas turbine such that a fuel-air ratio settles within a predetermined range, in parallel with execution of the load decreasing control.

According to another aspect of the present invention, a program is provided for causing a computer to function as means for selecting and executing any of normal control of calculating a fuel flow rate command value through feedback control based on a deviation between a target output and an actual output of a gas turbine and load decreasing control of calculating the fuel flow rate command value for reducing an output of the gas turbine to a predetermined target output during a predetermined first time without performing feedback control, and means for performing control of reducing a flow rate of air flowing into a compressor of the gas turbine such that a fuel-air ratio settles within a predetermined range, in parallel with execution of the load decreasing control.

Advantageous Effects of Invention

According to the control device, the gas turbine, the control method, and the program described above, a load can be reduced quickly while a surge in the compressor or accidental fire in the combustor is prevented, and thus operation of the gas turbine can be continued.

DESCRIPTION OF EMBODIMENT

Embodiment

Hereinafter, instant load reducing control of a gas turbine according to an embodiment of the present invention will be described with reference to FIGS. 1 to 15.

Figure 1:
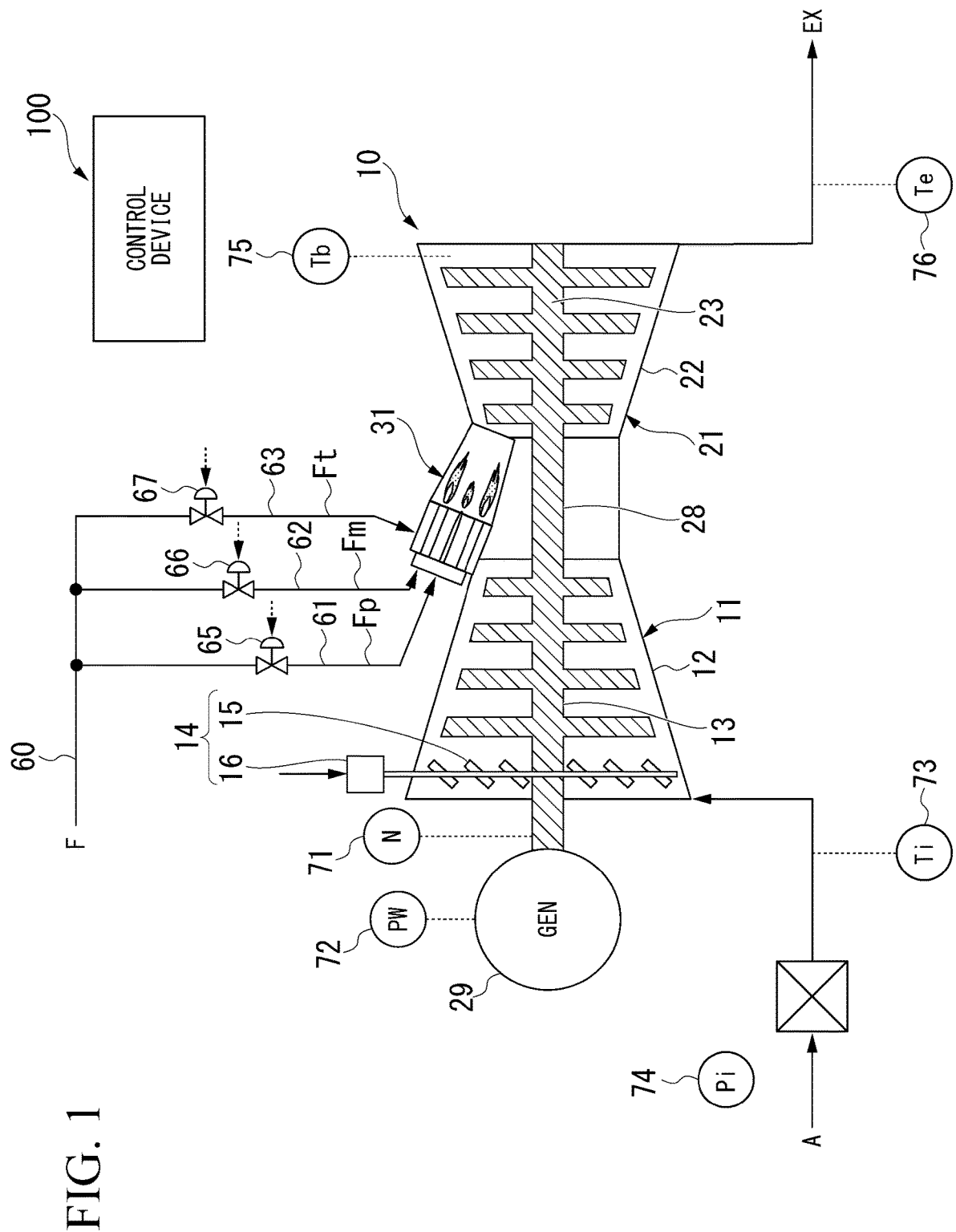
FIG. 1 is a system diagram of a gas turbine plant in an embodiment according to the present invention.

FIG. 1 is a system diagram of a gas turbine plant in the embodiment according to the present invention.

Figure 2:
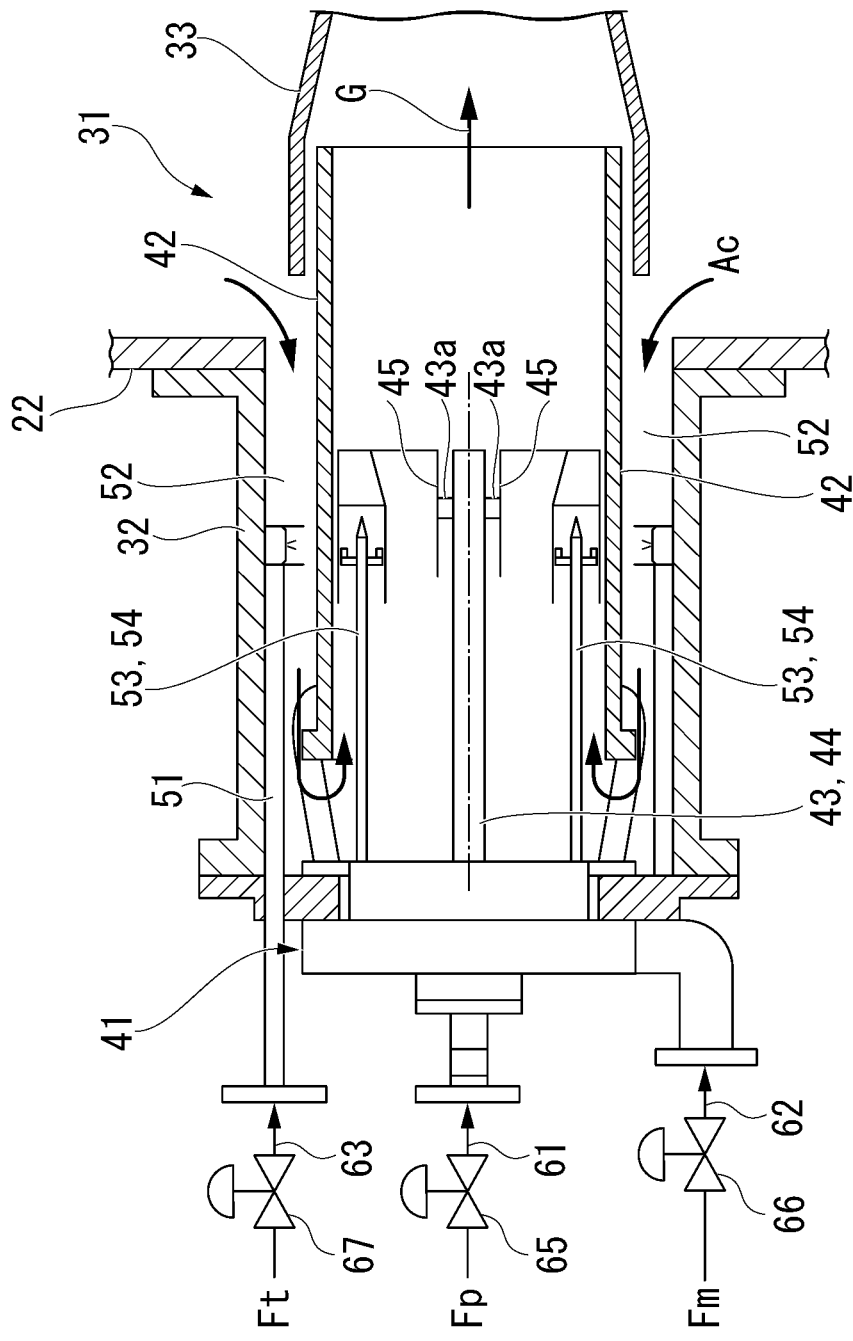
FIG. 2 is a first cross-sectional view of a combustor in the embodiment according to the present invention.

FIG. 2 is a first cross-sectional view of a combustor in the embodiment according to the present invention.

Figure 3:
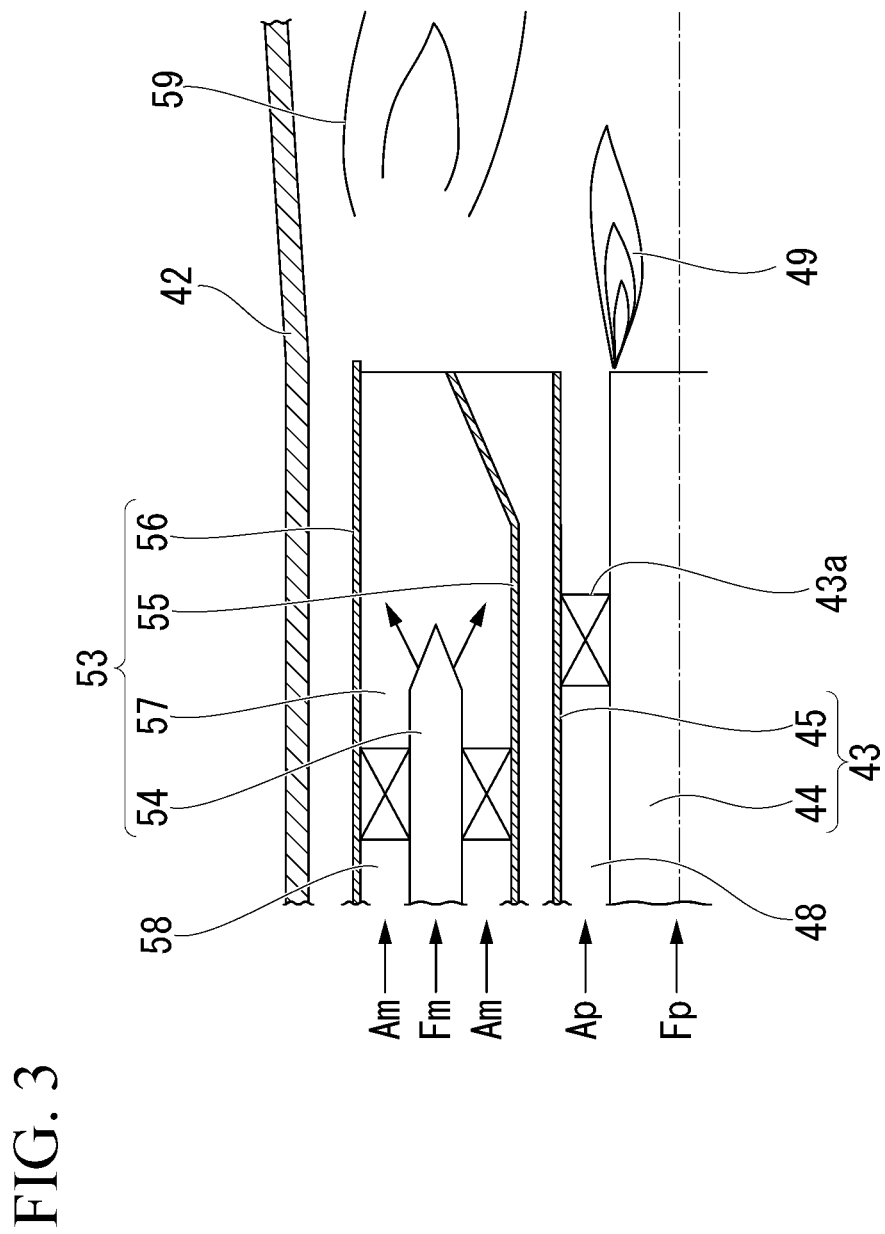
FIG. 3 is a cross-sectional view of a main part of the combustor in the embodiment according to the present invention.

FIG. 3 is a cross-sectional view of a main part of the combustor in the embodiment according to the present invention.

As illustrated in FIG. 1, the gas turbine plant of the present embodiment includes a gas turbine 10 and a power generator 29 which is driven by the gas turbine 10 and generates power. The gas turbine 10 includes a compressor 11 which compresses air, a combustor 31 which combusts fuel F in air compressed by the compressor 11 and generates combustion gas, and a turbine 21 which is driven by high-temperature/high-pressure combustion gas.

The compressor 11 has a compressor rotor 13 which rotates about an axis, a compressor casing 12 which covers this compressor rotor 13 such that it can rotate, and an inlet guide vane (IGV) 14 which is provided in a suction port of this compressor casing 12. The IGV 14 has a plurality of guide vanes 15 and a driver 16 which drives the plurality of guide vanes 15, and the IGV 14 regulates the flow rate of air suctioned into the compressor casing 12.

The turbine 21 has a turbine rotor 23 which rotates about the axis due to combustion gas from the combustor 31, and a turbine casing 22 which covers this turbine rotor 23 such that it can rotate. The turbine rotor 23 and the compressor rotor 13 rotate about the same axis and are joined to each other, thereby constituting a gas turbine rotor 28. A rotor of the power generator 29 is connected to this gas turbine rotor 28.

As illustrated in FIG. 2, the combustor 31 includes an outer cylinder 32 which is fixed to the turbine casing 22, a combustion cylinder (or a tail cylinder) 33 which is disposed inside the turbine casing 22 and sends combustion gas into a combustion gas flow channel of the turbine 21, and a fuel supplier 41 which supplies fuel and air to the inside of this combustion cylinder 33.

As illustrated in FIG. 2, the fuel supplier 41 has an inner cylinder 42, a pilot burner 43 which is disposed on a central axis of the inner cylinder 42, a plurality of main burners 53 which are disposed at equal intervals in a circumferential direction about this pilot burner 43, and a top hat nozzle 51 which is disposed on an inner circumferential side of the outer cylinder 32 and an outer circumferential side of the inner cylinder 42. Hereinafter, in a direction in which the central axis of the inner cylinder 42 extends, a side to which combustion gas G flows inside the combustion cylinder 33 will be referred to as a downstream side, and a side opposite thereto will be referred to as an upstream side.

The pilot burner 43 has a pilot nozzle 44 which is disposed on the central axis of the inner cylinder 42, and a cylindrical pilot guide 45 which surrounds an outer circumference of the pilot nozzle 44 and is provided coaxially with the pilot nozzle 44. A pilot air flow channel 48 for circulating pilot air Ap formed by the pilot guide 45 is formed on the outer circumference of the pilot nozzle 44. For example, a plurality of pilot swirlers 43a are installed on the outer circumference of the pilot nozzle 44 at equal intervals in the circumferential direction. These pilot swirlers 43a generate a swirl (swirl flow) in the pilot air Ap circulating in the pilot air flow channel 48 and promote mixing of the pilot air with pilot fuel Fp gushing from the pilot nozzle 44.

The pilot fuel Fp injected from the pilot nozzle 44 is combusted in the pilot air Ap gushing from this pilot air flow channel 48 and forms a premixed flame 49.

The main burner 53 has a cylindrical main air inner cylinder 55 which surrounds the outer circumference of a pilot air cylinder 45, a cylindrical main air outer cylinder 56 which surrounds the outer circumference of the main air inner cylinder 55, partition plates 57 which divide an annular space between the outer circumferential side of the main air inner cylinder 55 and the inner circumferential side of the main air outer cylinder 56 into a plurality of spaces in the circumferential direction, and main nozzles 54 which are disposed between a plurality of partition plates 57. A plurality of spaces defined by the main air inner cylinder 55, the main air outer cylinder 56, and the plurality of partition plates 57 constitute main air flow channels 58 in which compressed air Ac from the compressor 11 flows as main air Am. Main fuel Fm is injected from the main nozzles 54 disposed inside the main air flow channels 58 to the main air Am flowing in the main air flow channels 58. For this reason, premixed gas in which the main air Am and the main fuel Fm are mixed flows on the downstream side of tips (downstream ends) of the main nozzles 54 inside the main air flow channels 58. This premixed gas is combusted (premix combustion) when it flows out from the main air flow channels 58 and forms a premixed combustion flame 59. The premixed flame 49 described above plays a role of retaining this premixed combustion flame 59.

A space between the inner circumferential side of the outer cylinder 32 and the outer circumferential side of the inner cylinder 42 constitutes a compressed air flow channel 52 for guiding the compressed air Ac from the compressor 11 into the inner cylinder 42. The top hat nozzle 51 injects top hat fuel Ft to this compressed air flow channel 52. For this reason, when the top hat fuel Ft is injected into the compressed air flow channel 52, the top hat fuel Ft is incorporated into the main air Am and the pilot air Ap.

As illustrated in FIGS. 1 and 2, the gas turbine plant of the present embodiment further includes a pilot fuel line 61 for sending the pilot fuel Fp to the pilot nozzle 44, a main fuel line 62 for sending the main fuel Fm to the main nozzles 54, a top hat fuel line 63 for sending the top hat fuel Ft to the top hat nozzle 51, a pilot flow rate regulation valve 65 which regulates the flow rate of the pilot fuel Fp, a main flow rate regulation valve 66 which regulates the flow rate of the main fuel Fm, a top hat flow rate regulation valve 67 which regulates the flow rate of the top hat fuel Ft, and a control device 100 which controls operation and the like of these flow rate regulation valves 65, 66, and 67.

All of the pilot fuel line 61, the main fuel line 62, and the top hat fuel line 63 are lines branching from a fuel line 60. The pilot flow rate regulation valve 65 is provided in the pilot fuel line 61, the main flow rate regulation valve 66 is provided in the main fuel line 62, and the top hat flow rate regulation valve 67 is provided in the top hat fuel line 63.

As illustrated in FIG. 1, the gas turbine plant of the present embodiment further includes a rotation frequency gauge 71 for measuring a rotation frequency N of the gas turbine rotor 28, an output meter 72 for measuring an output of the power generator 29, a thermometer 73 for measuring an atmospheric air temperature which is a temperature of air A suctioned by the compressor 11, a pressure gauge 74 for measuring an atmospheric pressure Pi which is a pressure of air suctioned by the compressor 11, a thermometer 75 for measuring a blade path temperature Tb which is a temperature of combustion gas immediately after a final stage in the turbine 21, and a thermometer 76 for measuring a temperature Te of exhaust gas inside an exhaust duct on the downstream side of the final stage in the turbine 21.

Figure 4:
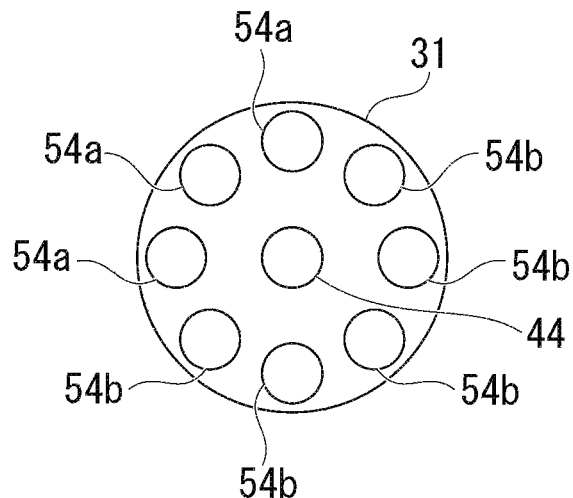
FIG. 4 is a second cross-sectional view of the combustor in the embodiment according to the present invention.

FIG. 4 is a second cross-sectional view of the combustor in the embodiment according to the present invention.

FIG. 4 is a view schematically illustrating a cross section perpendicular to a direction in which the combustion gas G of the combustor 31 flows. As illustrated in FIG. 4, the pilot nozzle 44 is provided at the center of the combustor 31, and three main nozzles 54 (first main nozzles 54a) are provided side by side in the circumferential direction on the outer circumferential side of this pilot nozzle 44. Further, in the combustor 31, five main nozzles 54 (second main nozzles 54b) are provided side by side in the circumferential direction on the outer circumferential side of the pilot nozzle 44. Disposition or the number of nozzles can be suitably set.

Figure 5:
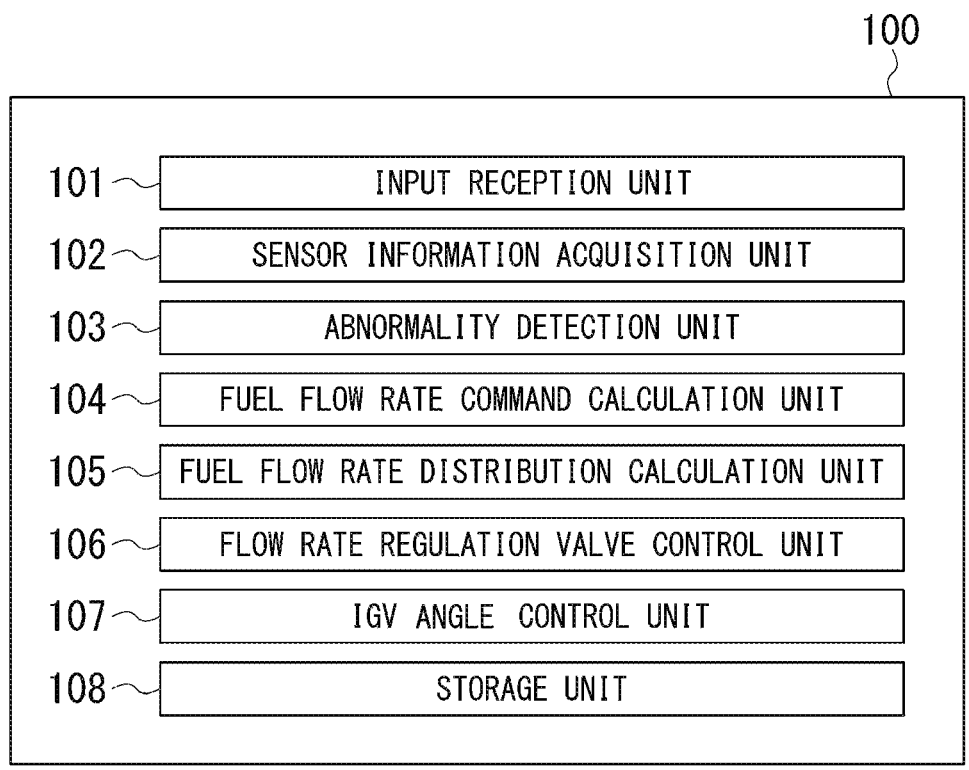
FIG. 5 is a block diagram of a control device in the embodiment according to the present invention.

FIG. 5 is a block diagram of the control device in the embodiment according to the present invention.

As shown in the diagram, the control device 100 includes an input reception unit 101, a sensor information acquisition unit 102, an abnormality detection unit 103, a fuel flow rate command calculation unit 104, a fuel flow rate distribution calculation unit 105, a flow rate regulation valve control unit 106, an IGV angle control unit 107, and a storage unit 108. The control device 100 is constituted of a computer.

The input reception unit 101 receives an input of an instruction operation from a user or inputs of various signals from other devices. For example, the input reception unit 101 receives an input of a signal (instant load decreasing in-control signal) indicating that instant load decreasing control is executed.

The sensor information acquisition unit 102 acquires a value measured by each of sensors included in the gas turbine plant. For example, the sensor information acquisition unit 102 acquires an output of the power generator 29 measured by the output meter 72 or an atmospheric air temperature measured by the thermometer 73.

For example, the abnormality detection unit 103 detects occurrence of abnormal combustion based on the value (blade path temperature Tb) which is measured by the thermometer 75 and is acquired by the sensor information acquisition unit 102. For example, when the blade path temperature Tb fluctuates to an extent of a predetermined value or higher per unit time, the abnormality detection unit 103 determines that abnormal combustion has occurred.

The fuel flow rate command calculation unit 104 calculates a fuel flow rate command value by selecting any of normal control of calculating the fuel flow rate command value through feedback control based on a deviation between a target output and an actual output of the gas turbine 10 and instant load decreasing control of calculating the fuel flow rate command value for reducing an output of the gas turbine 10 to a predetermined target output during a predetermined time without performing feedback control. For example, the predetermined time is within a range of 2 to 5 seconds. This time is a time suitable for avoiding accidental fire or abnormal combustion in the combustor 31. For example, the predetermined target output is an output corresponding to 30% to 40% when a rated output is 100%. In this specification, control of reducing the output to approximately 30% to 40% within 2 to 5 seconds will be referred to as instant load decreasing control.

In the instant load decreasing control, an output from the power generator 29 is reduced at a rate within a range of 800 to 2,000%/min and 13 to 33%/min. When the instant load decreasing control is executed, the fuel flow rate command calculation unit 104 switches a reduction rate, at which an output of the gas turbine 10 is reduced to the target output, in accordance with the atmospheric air temperature.

In an example, it is known that a load decreased to approximately 35% is a load with which abnormal combustion can be avoided and which allows stable combustion. It is also known that a risk of a compressor surge increases when a time required for a load decrease becomes two seconds or shorter and a risk of an instrument burnout due to abnormal combustion increases when it becomes five seconds or longer. Here, a load is set to approximately 30% to 40% as an example. However, as long as the load can avoid abnormal combustion and allow stable combustion, the instant load decreasing control of the present embodiment may be applied to control of reducing a load to 50% or more, for example, within a predetermined time.

For example, the fuel flow rate distribution calculation unit 105 calculates a distribution ratio for the pilot nozzle 44 from a function stipulating a relationship between a turbine inlet temperature stored by the storage unit 108 based on the turbine inlet temperature (temperature of combustion gas flowing into the turbine 21) and the distribution ratio (PLB ratio) of fuel supplied to the pilot nozzle 44. Similarly, the fuel flow rate distribution calculation unit 105 calculates the distribution ratio of fuel supplied to the top hat nozzle 51 from a function stipulating a relationship between the turbine inlet temperature and the distribution ratio (TH ratio) of fuel supplied to the top hat nozzle 51. Further, the fuel flow rate distribution calculation unit 105 calculates the distribution ratio of fuel supplied to the remaining main nozzles 54 (the first main nozzles 54a and the second main nozzles 54b) by subtracting the sum of the distribution ratios for the pilot nozzle 44 and the top hat nozzle 51 from 100%. The fuel flow rate distribution calculation unit 105 calculates the fuel flow rate command value for each of the fuel systems by multiplying the fuel flow rate command value calculated by the fuel flow rate command calculation unit 104 by the distribution ratio for each of the fuel systems (the pilot fuel line 61, the main fuel line 62, and the top hat fuel line 63). When the fuel flow rate command value for each of the fuel systems is calculated, the fuel flow rate distribution calculation unit 105 outputs the values thereof to the flow rate regulation valve control unit 106.

The flow rate regulation valve control unit 106 calculates valve opening positions of the flow rate regulation valves (the pilot flow rate regulation valve 65, the top hat flow rate regulation valve 67, and the main flow rate regulation valve 66) provided in the respective fuel systems based on the fuel flow rate command value for each of the fuel systems. Specifically, based on the fuel flow rate command value prepared for each of the flow rate regulation valves, an inlet pressure and an outlet pressure of the flow rate regulation valve, a fuel density, and a fuel temperature, the flow rate regulation valve control unit 106 calculates the valve opening position for each of the flow rate regulation valves using a function or the like stored by the storage unit 108 calculating the valve opening positions corresponding to these parameters. Further, the flow rate regulation valve control unit 106 controls the pilot flow rate regulation valve 65, the top hat flow rate regulation valve 67, and the main flow rate regulation valve 66 based on the calculated valve opening positions.

When the fuel flow rate command calculation unit 104 executes the normal control, the IGV angle control unit 107 controls the opening degree of the IGV in accordance with an output of the gas turbine 10. When the fuel flow rate command calculation unit 104 executes instant load decreasing control, the IGV angle control unit 107 controls the opening degree of the IGV 14 such that an air-fuel ratio in the combustor 31 settles within an appropriate predetermined range (range in which accidental fire or abnormal combustion does not occur). Specifically, the opening degree of the IGV 14 is changed from the opening degree at the time of starting the instant load decreasing control to the opening degree (for example, fully closed) corresponding to an output at the time of a load decrease during a time approximately the same as the time (2 to 5 seconds) during which the fuel flow rate command calculation unit 104 reduces a load.

The storage unit 108 store various kinds of data.

Figure 6:
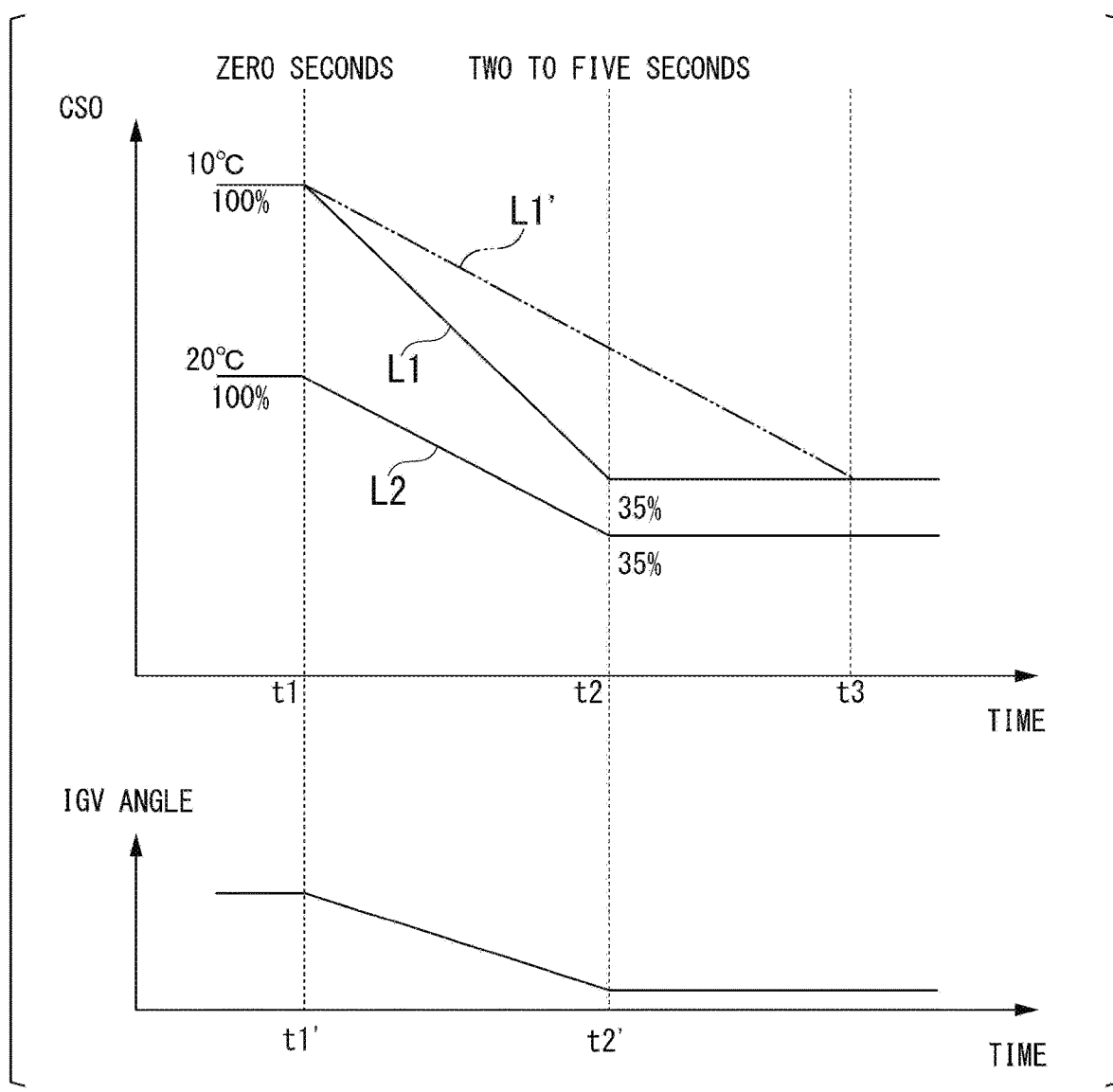
FIG. 6 is a view for describing a control method in the embodiment according to the present invention.

FIG. 6 is a view for describing a control method in the embodiment according to the present invention.

FIG. 6 shows a relationship between a fuel flow rate command value CSO and the opening degree of the IGV 14 when a load is decreased from 100% (before control starts) to 35% during 2 to 5 seconds using the instant load decreasing control of the present embodiment.

The upper diagram in FIG. 6 shows a progress of the fuel flow rate command value control signal output (CSO) calculated by the fuel flow rate command calculation unit 104 at the time of the instant load decreasing control. In the upper diagram, the horizontal axis indicates the time, and the vertical axis indicates the magnitude of the CSO. The magnitude of the fuel flow rate command value CSO and an output of the gas turbine 10 have a positive correlationship therebetween. When the CSO increases, an output of the gas turbine 10 also increases. In addition, regarding a certain output value, when the atmospheric air temperature becomes a higher temperature, the value of the CSO decreases, and when the atmospheric air temperature becomes a low temperature, the value of the CSO increases. That is, even when the same output is performed from the gas turbine 10, the value of the CSO varies depending on the atmospheric air temperature. The graph L1 in the upper diagram of FIG. 6 indicates a CSO when the atmospheric air temperature is 10° C., and the graph L2 indicates a CSO when the atmospheric air temperature is 20° C. The fuel flow rate command calculation unit 104 calculates the CSO corresponding to an output after the instant load decreasing control based on an output after the instant load decreasing control and a function stipulating a relationship between the CSO and an output of the gas turbine 10. The fuel flow rate command calculation unit 104 calculates reduction plan information of the fuel flow rate command value CSO based on the CSOs before and after the instant load decreasing control and the time (predetermined time within a range of 2 to 5 seconds)

for reducing an output. For example, the reduction plan information includes the values of the CSOs for the respective predetermined times regarding the time for reducing an output. For example, the fuel flow rate command calculation unit 104 calculates the reduction plan information such that the CSO is reduced at a uniform reduction rate as shown in the upper diagram of FIG. 6. As another example, the fuel flow rate command calculation unit 104 may calculate the reduction plan information such that the CSO reduction rate changes in accordance with a time elapsed from start of the instant load decreasing control, for example.

Here, the graph L1' shows an example of a case in which the CSO is reduced by the fuel flow rate command calculation unit 104 at a predetermined reduction rate regardless of the atmospheric air temperature. The graph L1' shows a progress of a CSO when the CSO is reduced at the same rate as that at the atmospheric air temperature of 20° C. In this case, the CSO is reduced to a value corresponding to 35% of the output at a time t3. When a timing of reaching a value corresponding to 35% of the output is delayed, a fuel input amount increases relatively, and thus there is concern that a flame temperature may exceed. In contrast to this, when the atmospheric air temperature is 20° C., if the CSO is reduced at a rate similar to that in a case in which the atmospheric air temperature is 10° C., the timing for the CSO reaching a value corresponding to 35% of the output becomes earlier, and thus there is a likelihood of accidental fire due to the fuel input amount which has been relatively decreased. If the reduction rate of the CSO is fixed regardless of the atmospheric air temperature in this manner, controllability with respect to a flame of the combustor 31 deteriorates, and thus operation of the gas turbine 10 cannot be continued over a period before and after an instant load decrease. Therefore, the fuel flow rate command calculation unit 104 changes the reduction rate of the CSO in accordance with the atmospheric air temperature. Accordingly, the flame temperature behavior in the combustor 31 becomes robust, so that accidental fire resistance can be improved.

The lower diagram in FIG. 6 shows a progress of the opening degree of the IGV 14 calculated by the IGV angle control unit 107 at the time of the instant load decreasing control. In the lower diagram, the horizontal axis indicates the time, and the vertical axis indicates the opening degree of the IGV 14. The opening degree of the IGV 14 and the flow rate of air flowing into the compressor 11 have a positive correlation therebetween. When the opening degree of the IGV 14 increases, the flow rate of air increases. Regarding a relationship between an output of the gas turbine 10 and the opening degree of the IGV 14 as well, a positive correlation is established therebetween. When the output is high, the opening degree is increased, and when the output is low, the opening degree is reduced. The graph L3 in the lower diagram of FIG. 6 indicates the opening degree of the IGV 14 calculated by the IGV angle control unit 107. The IGV angle control unit 107 calculates the opening degree of the IGV 14 corresponding to an output after the instant load decreasing control based on an output (corresponding to 35%) after the instant load decreasing control and a function stipulating the relationship between the opening degree of the IGV 14 and the output of the gas turbine 10. The IGV angle control unit 107 calculates the reduction plan information for reducing the opening degree of the IGV 14 from a current opening degree to a predetermined target opening degree (for example, fully closed) based on the opening degree of the IGV 14 before and after the instant load decreasing control and the time (2 to 5 seconds) for reducing the CSO. For example, the IGV angle control unit 107 calculates the reduction plan information for reducing the opening degree at a uniform ratio as shown in the lower diagram of FIG. 6. For example, the reduction plan information includes values of IGV angles for the respective predetermined times regarding the time for reducing the opening degree. Furthermore, for example, the IGV angle control unit 107 may calculate the reduction plan information such that the reduction rate of the opening degree changes in accordance with a time elapsed from start of the instant load decreasing control.

When the fuel flow rate command calculation unit 104 starts to reduce the CSO (time t1), the IGV angle control unit 107 starts control of reducing the opening degree of the IGV 14 at the same time (time t1'). Alternatively, in consideration of a delay from an output of the CSO until actual fuel control is performed, the time t1' may be slightly later than the time t1. Further, the IGV angle control unit 107 closes the IGV 14 at a change rate such that air of a flow rate maintaining a fuel-air ratio at which a flame of the combustor 31 becomes stable can be suctioned. For a stable flame of the combustor 31, it is desirable that the time required to reduce the opening degree of the IGV 14 and the time required to reduce the CSO coincide with each other or the difference between the two times be within a predetermined permissible range. In other words, the IGV angle control unit 107 reduces the opening degree of the IGV 14 at a change rate such that an IGV target opening degree can be achieved within a time during which a difference (when the time t1' is delayed, as much a delay as the delay may be included) between a time t2 at which the fuel flow rate command calculation unit 104 finishes reducing the CSO to a target value and a time t2' at which the opening degree of the IGV 14 reaches the target value settles within a permissible range. That is, the IGV angle control unit 107 reduces the opening degree of the IGV 14 such that a difference between a time at which the fuel flow rate command calculation unit 104 finishes reducing the CSO to a target value and a time at which the flow rate of air flowing into the compressor 11 is reduced to a predetermined target flow rate settles within a predetermined permissible range.

Through the control described using FIG. 6, while a flame of the combustor 31 is retained in a normal state, the output of the gas turbine 10 can be instantly (within 2 to 5 seconds) decreased to approximately 35%. In addition, even after the output is reduced, operation can be continued with the output.

Next, with reference to FIGS. 7 and 8, an example of a configuration of the control device according to the control described in FIG. 6 will be described.

Figure 7:
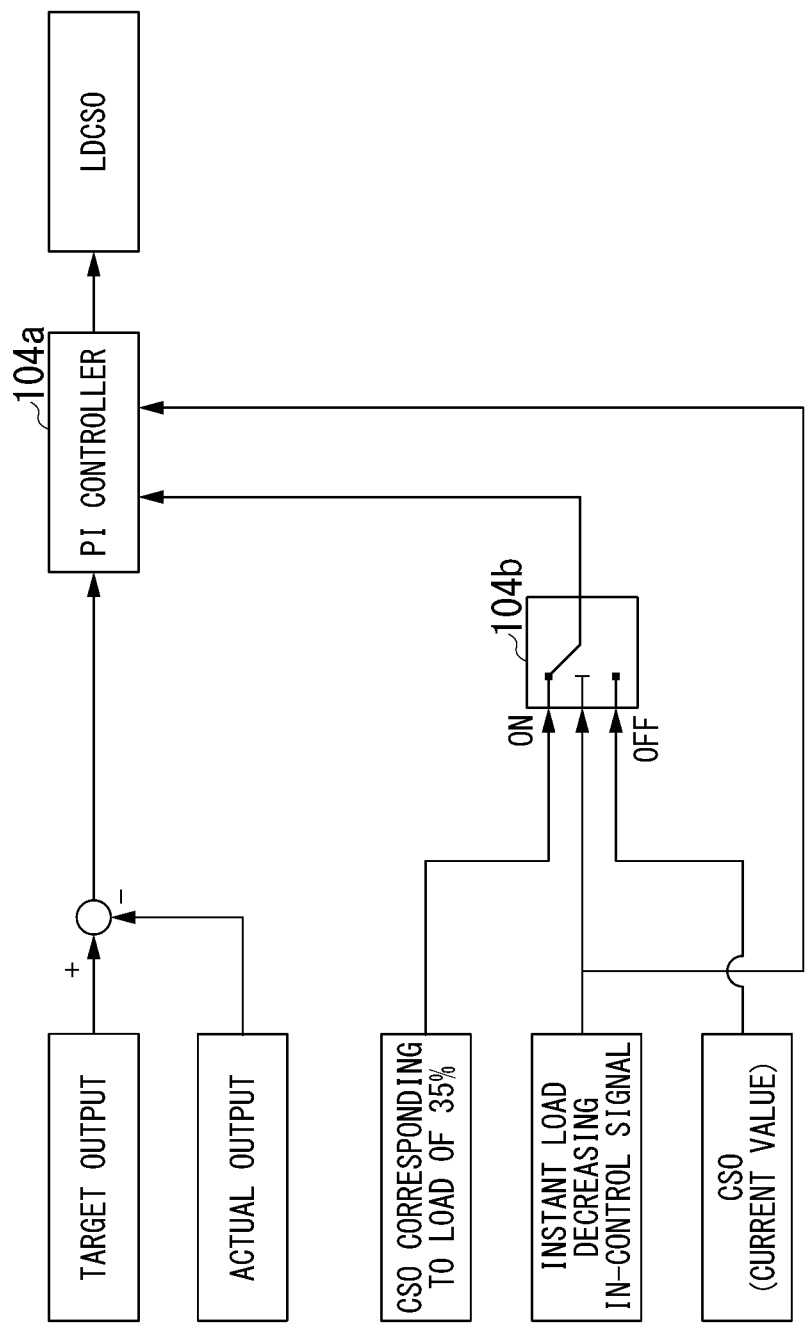
FIG. 7 is a view illustrating an example of controlling a fuel flow rate command value in the embodiment according to the present invention.

FIG. 7 is a view illustrating an example of controlling a fuel flow rate command value in the embodiment according to the present invention.

FIG. 7 shows the control method for the normal control and the instant load decreasing control performed by the fuel flow rate command calculation unit 104. The fuel flow rate command calculation unit 104 includes a PI controller 104a with a function of overwriting a control command value and a switcher 104b with a function of calculating a reduction rate of the CSO.

Normal Control

At the time of the normal control, the fuel flow rate command calculation unit 104 calculates a deviation between a target output and an actual output of the gas turbine 10. The PI controller 104a calculates a control command value load limit control signal output (LDCSO)

for setting this deviation to zero. The fuel flow rate command calculation unit 104 calculates not only the LDCSO which is a control command value based on a load but also a control command value based on a rotation speed of the gas turbine, a control command value based on an exhaust gas temperature, a control command value based on a combustion gas temperature, and the like. The fuel flow rate command calculation unit 104 selects the smallest value thereamong and sets the value as the fuel flow rate command value CSO. Further, as described above, the fuel flow rate distribution calculation unit 105 calculates a fuel distribution ratio for each of the fuel systems, and the flow rate regulation valve control unit 106 controls the opening degrees of the pilot flow rate regulation valve 65, the top hat flow rate regulation valve 67, and the main flow rate regulation valve 66 in accordance with the fuel flow rate command value CSO and the distribution ratio. Accordingly, the amount of fuel supplied to the combustor 31 is controlled.

Instant Load Decreasing Control

At the time of the instant load decreasing control, when an operation is performed through PI control, the control cannot catch up a rapid decrease of a load. Therefore, the output is switched from a CSO corresponding to a load of 100% to a CSO corresponding to a load of 35% using the switcher 104b. In addition, the output from the PI controller 104a is caused to track the CSO corresponding to a load of 35% to follow a rapid change. That is, the switcher 104b generates an LDCSO for reducing the output within 2 to 5 seconds, and the LDCSO for the PI control is overwritten with this LDCSO.

First, when the input reception unit 101 acquires an instant load decreasing in-control signal, the fuel flow rate command calculation unit 104 inputs the instant load decreasing in-control signal to the switcher 104b. Consequently, the switcher 104b calculates the reduction rate of the CSO based on the atmospheric air temperature measured by the thermometer 73, the CSO before the instant load decreasing control, the CSO according to the atmospheric air temperature corresponding to a load of 35%, and the time (predetermined time within 2 to 5 seconds) for reducing the CSO. The time for reducing the CSO and the reduction rate (35%) of a load are set in advance.

The switcher 104b outputs a CSO and an instant load decreasing in-control signal for each of the predetermined times based on the calculated reduction rate to the PI controller 104a. When an instant load decreasing in-control signal is acquired, the PI controller 104a overwrites the LDCSO calculated through the PI control with the CSO which has been acquired together with an instant load decreasing in-control signal and follows the load decrease, and the PI controller 104a outputs an overwritten value as an LDCSO. A process similar to that of the normal control applies to successive control.

Through the control described using FIG. 7, the fuel flow rate command calculation unit 104 can execute control switching between the normal control and the instant load decreasing control. In the instant load decreasing control, the fuel flow rate command calculation unit 104 calculates the fuel flow rate command value CSO corresponding to an output at each time of the outputs rapidly changing during a load decrease. Accordingly, an output of the gas turbine 10 can be reduced to approximately 35% of a rated load within a predetermined time (within 2 to 5 seconds).

In FIG. 7, an example of control in which a CSO is reduced at a reduction rate in accordance with an atmospheric air temperature using an LDCSO has been described, but the embodiment is not limited thereto. For example, a fuel flow rate command value CSO for each of predetermined times for realizing a reduction rate in accordance with an atmospheric air temperature may be calculated with respect to a CSO calculated by a method similar to that of the normal control.

Figure 8:
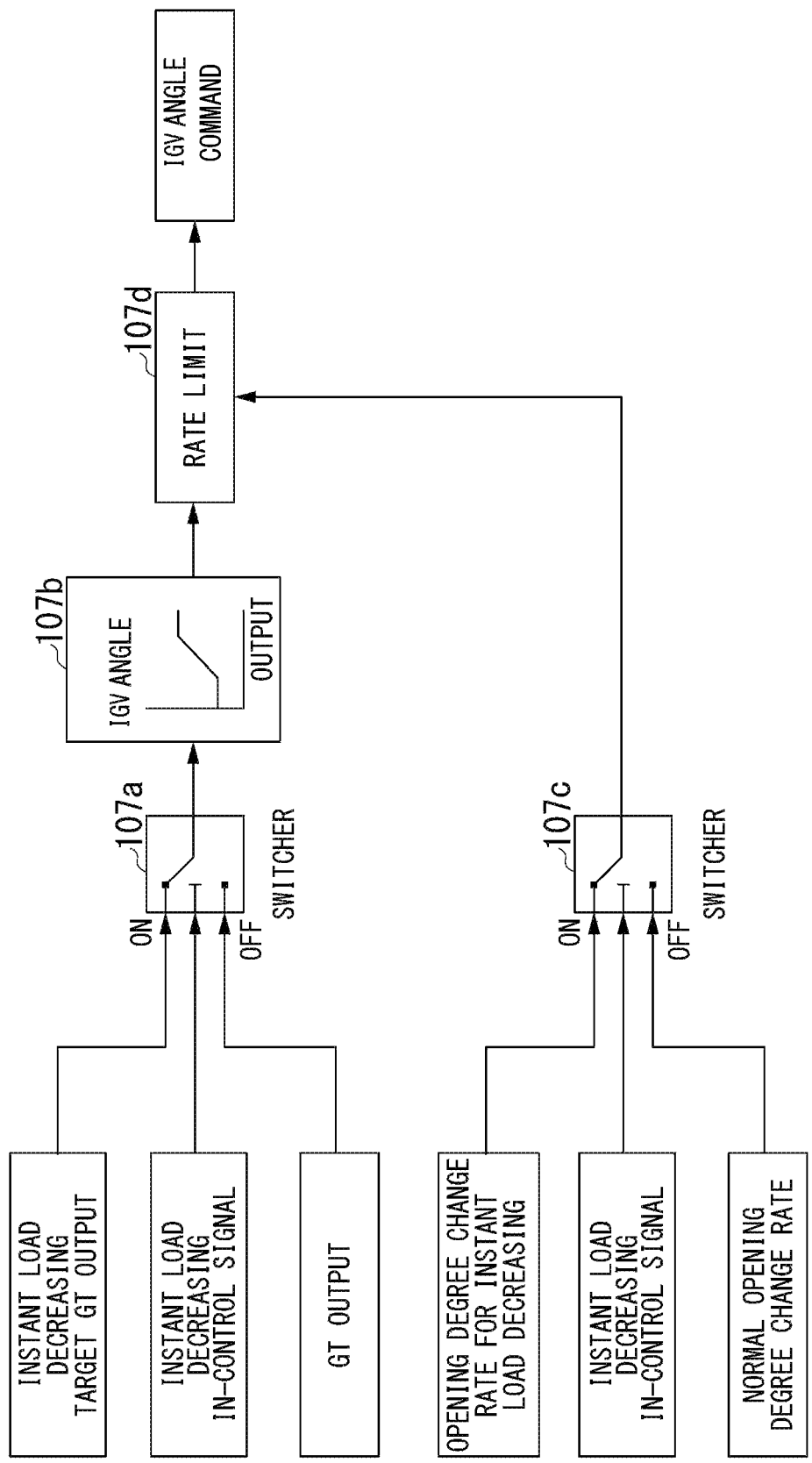
FIG. 8 is a view illustrating an example of controlling an IGV angle in the embodiment according to the present invention.

FIG. 8 is a view illustrating an example of controlling an IGV angle in the embodiment according to the present invention.

FIG. 8 shows IGV control in the normal control and the instant load decreasing control performed by the IGV angle control unit 107. The IGV angle control unit 107 includes a switcher 107a, a function 107b which stipulates the relationship between the output of the gas turbine 10 and the opening degree of the IGV 14, a switcher 107c, and a controller 107d which controls a change rate of the opening degree of the IGV 14.

Normal Control

At the time of the normal control, there is no input of an instant load decreasing in-control signal. In this case, a current output of the gas turbine 10 is input to the switcher 107a, and a normal opening degree change rate of the IGV 14 is input to the switcher 107c. For example, a normal opening degree change rate is approximately 400%/min. The function 107b calculates a target IGV angle corresponding to a current output of the gas turbine 10 and outputs it to the controller 107d. The controller 107d acquires the target IGV angle and the normal opening degree change rate and calculates an IGV angle command value for changing the opening degree of the IGV 14 at the normal opening degree change rate from the current opening degree to the target IGV angle using these acquired values and the current opening degree of the IGV 14.

Instant Load Decreasing Control

At the time of the instant load decreasing control, an instant load decreasing in-control signal is input to the switcher 107a and the switcher 107c. Consequently, an output (for example, corresponding to 35%) of the gas turbine 10 at the time of a load decrease is input to the switcher 107a, and an opening degree change rate of the IGV 14 for an instant load decrease is input to the switcher 107c. An opening degree change rate for an instant load decrease is a rate (approximately 750%/min to 2,000%/min) at which a switching time from a fully open state to a fully closed state becomes within 2 to 5 seconds. However, a rate, of the rates within this range, at which the opening degree of the IGV 14 can be reduced to a target opening degree taking substantially the same time as that of the CSO is set in advance, and this value is input. The function 107b calculates the target IGV angle corresponding to the output of the gas turbine 10 (corresponding to 35%) at the time of a load decrease and outputs it to the controller 107d. The controller 107d acquires the target IGV angle and the opening degree change rate for an instant load decrease and calculates the IGV angle command value with which the opening degree of the IGV 14 can be changed at the opening degree change rate for an instant load decrease from the current opening degree to the target IGV angle using these acquired values and the current opening degree of the IGV 14.

Through the control described using FIG. 8, the IGV angle control unit 107 can execute control switching between the normal control and the instant load decreasing control. In the instant load decreasing control, the IGV angle control unit 107 reduces the IGV angle such that it is synchronized with the CSO reduced by the fuel flow rate command calculation unit 104. Accordingly, even in a circumstance in which a load is quickly decreased, the fuel-air ratio can be maintained within an appropriate range, and accidental fire or the like in the combustor 31 can be prevented. The IGV angle control unit 107 may change the opening degree change rate of the IGV 14 in accordance with the atmospheric air temperature.

Next, control of the pilot flow rate regulation valve 65 and the top hat flow rate regulation valve 67 in the instant load decreasing control will be described.

As described below, in control of the pilot flow rate regulation valve 65 and the top hat flow rate regulation valve 67, instant load decreasing control in a case of accompanying abnormal combustion is added in addition to the normal control and the instant load decreasing control. In the related art, when abnormal combustion occurs, a load shutoff for cutting off a load is often performed from the viewpoint of instrument protection. However, when a load is shut off, an opportunity for power generation may be missed. Therefore, the present embodiment provides a control method in which instrument protection is achieved through the instant load decreasing control instead of a load shutoff. This is instant load decreasing control in a case of accompanying abnormal combustion. When abnormal combustion has occurred, if the abnormal combustion continues for a long time, instrument damage such as a nozzle burnout occurs. Therefore, a load is decreased to approximately 35% within approximately 4 seconds from when abnormal combustion has been detected, and control of shutting off fuel supply from the top hat nozzle 51 is performed at a timing when the load decrease has been completed. In order to avoid an accidental fire phenomenon in which a pilot flame cannot be retained and is blown off, control of temporarily increasing fuel supplied to the pilot nozzle 44 is performed at the same time as fuel supply from the top hat nozzle 51 is shut off.

Figure 9:
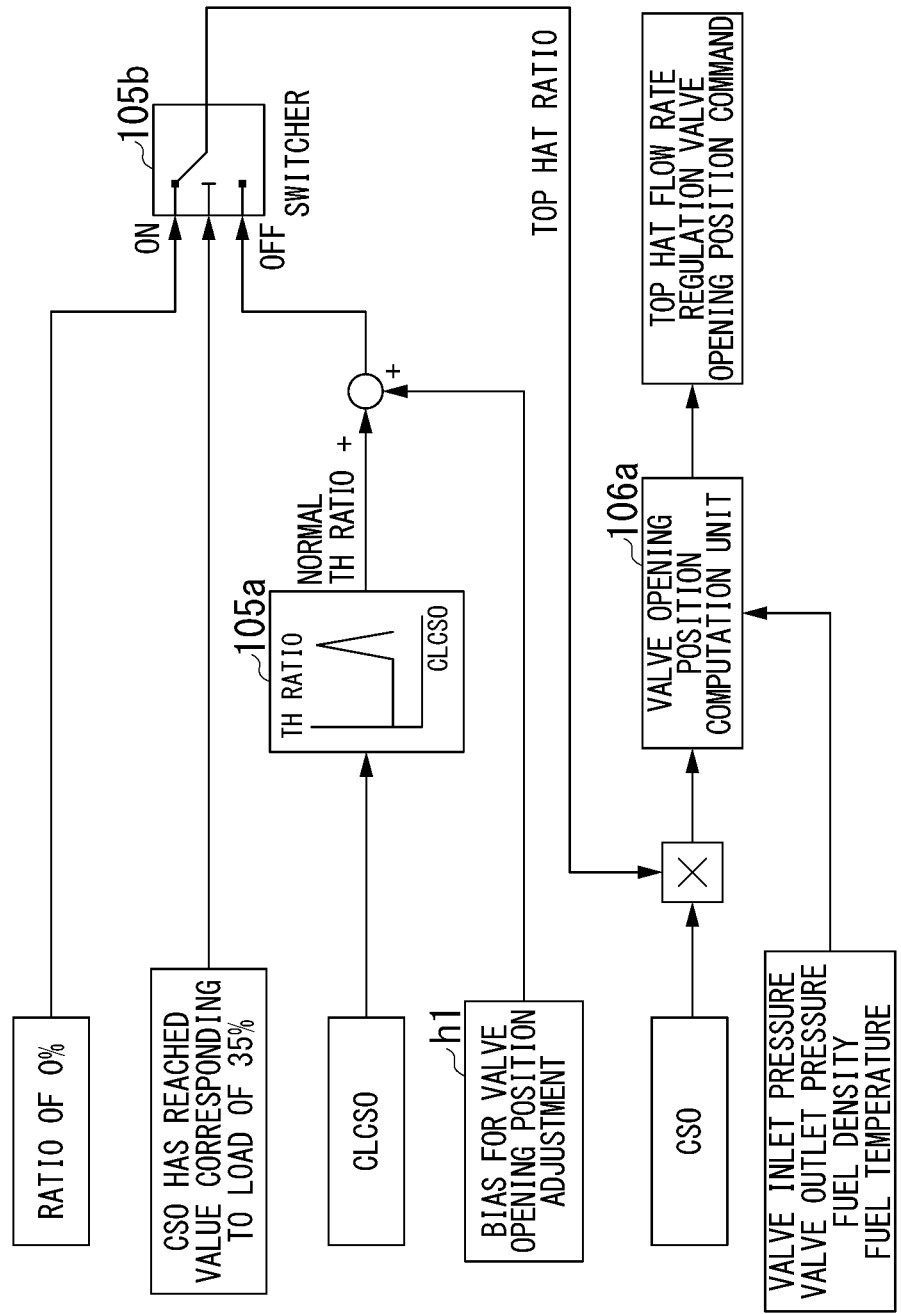
FIG. 9 is a first view illustrating an example of controlling a fuel nozzle in the embodiment according to the present invention.

FIG. 9 is a first view illustrating an example of controlling a fuel nozzle in the embodiment according to the present invention.

FIG. 9 shows processing of calculating a fuel supply amount from the top hat nozzle 51 in the normal control and the instant load decreasing control performed by the fuel flow rate distribution calculation unit 105 and the flow rate regulation valve control unit 106.

The fuel flow rate distribution calculation unit 105 includes a function 105a which stipulates a relationship between a combustion load command value CLCSO and the distribution ratio (TH ratio) of fuel for top hat nozzle 51, and a switcher 105b. The flow rate regulation valve control unit 106 includes a valve opening position computation unit 106a which calculates an opening degree of the top hat flow rate regulation valve 67.

Normal Control

First, the fuel flow rate distribution calculation unit 105 calculates the combustion load command value CLCSO based on a turbine output of the turbine 21, an IGV angle, and an atmospheric air temperature. The combustion load command value CLCSO is a parameter having a positive correlation with the turbine inlet temperature of the turbine 21. Next, the function 105a calculates the TH ratio for the combustion load command value CLCSO. Next, the fuel flow rate distribution calculation unit 105 calculates the fuel flow rate command value for a top hat system by multiplying the fuel flow rate command value CSO and the TH ratio.

In the flow rate regulation valve control unit 106, the valve opening position computation unit 106a calculates a valve opening position command value for the top hat flow rate regulation valve 67 based on the fuel flow rate command value for the top hat system, the inlet pressure and the outlet pressure of the top hat flow rate regulation valve 67, the fuel density, and the fuel temperature.

Instant Load Decreasing Control

At the time of the instant load decreasing control, a bias h1 for valve opening position adjustment is added to the TH ratio calculated by the function 105a. The bias h1 is a predetermined correction amount required to cope with combustion vibration which is likely to occur during a rapid load fluctuation. A correction amount (bias h1) for coping with combustion vibration will be described later together with control of the pilot flow rate regulation valve 65. A process similar to that of the normal control applies to successive processing.

Instant Load Decreasing Control in Case of Involving Abnormal Combustion

When abnormal combustion has occurred at the time of the instant load decreasing control, control of the foregoing "instant load decreasing control" is performed until the CSO is reduced to a predetermined target value (for example, the CSO corresponding to 35% of an output). When the CSO reaches the predetermined target value, the fuel flow rate command calculation unit 104 generates a signal indicating that the CSO has reached the predetermined target value and outputs the signal to the fuel flow rate distribution calculation unit 105. In the fuel flow rate distribution calculation unit 105, a signal indicating that the CSO has reached the predetermined target value (in the diagram, "CSO HAS REACHED VALUE CORRESPONDING TO LOAD OF 35%") is input to the switcher 105b. Consequently, the switcher 105b outputs the TH ratio of 0%. The fuel flow rate distribution calculation unit 105 outputs zero as the fuel flow rate command value for the top hat system to the flow rate regulation valve control unit 106. Consequently, the valve opening position command value for the top hat flow rate regulation valve 67 calculated by the flow rate regulation valve control unit 106 becomes 0%, and the top hat flow rate regulation valve 67 is closed. Accordingly, supply of fuel from the top hat nozzle 51 is shut off. If the CSO is reduced to the predetermined target value through the instant load decreasing control when abnormal combustion occurs in this manner, the fuel flow rate distribution calculation unit 105 sets 0% for the TH ratio in order to prevent a nozzle burnout or the like. Consequently, the fuel flow rate distribution calculation unit 105 performs processing of redistributing the distribution ratio for the fuel flow rate command value CSO to remaining systems (a pilot system and a main system). Next, control of the pilot flow rate regulation valve 65 will be described.

Figure 10:
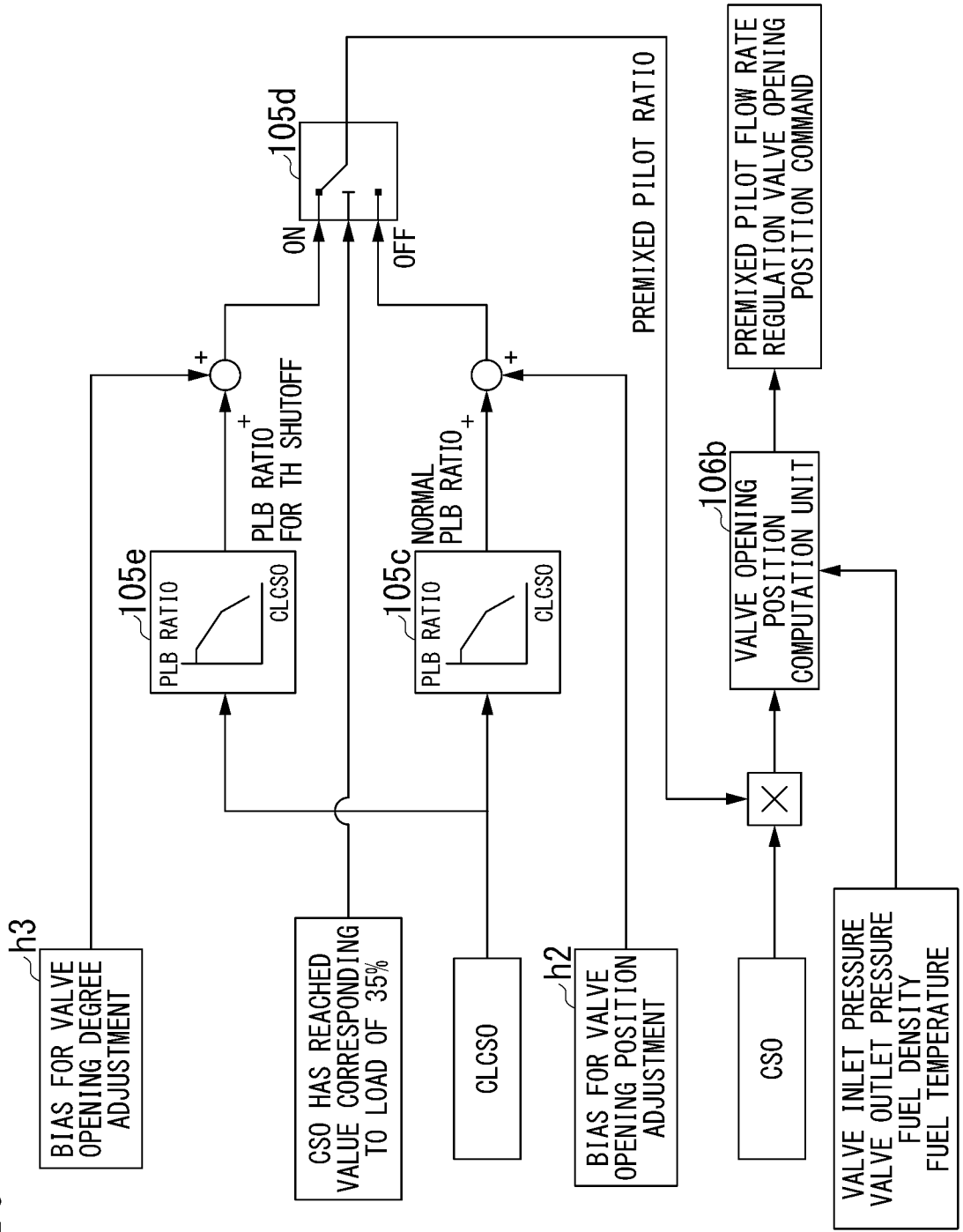
FIG. 10 is a second view illustrating an example of controlling the fuel nozzle in the embodiment according to the present invention.

FIG. 10 is a second view illustrating an example of controlling the fuel nozzle in the embodiment according to the present invention.

FIG. 10 shows processing of calculating a fuel supply amount from the pilot nozzle 44 in the normal control and the instant load decreasing control performed by the fuel flow rate distribution calculation unit 105 and the flow rate regulation valve control unit 106.

The fuel flow rate distribution calculation unit 105 includes a function 105c and a function 105e which stipulate a relationship between the combustion load command value CLCSO and the distribution ratio (PLB ratio) of fuel for the pilot nozzle 44, and a switcher 105d. The function 105c is a function during a normal time, that is, when the TH ratio is not 0%, and the function 105e is a function used for calculating the distribution ratio for the remaining pilot system and main system after the TH ratio is set to 0% when abnormal combustion has occurred. The flow rate regulation valve control unit 106 includes a valve opening position computation unit 106b which calculates the opening degree of the pilot flow rate regulation valve 65.

Normal Control

First, the fuel flow rate distribution calculation unit 105 calculates the combustion load command value CLCSO based on the turbine output, the IGV angle, and the atmospheric air temperature. Next, the function 105c calculates the PLB ratio for the combustion load command value CLCSO. The switcher 105d outputs this PLB ratio. Next, the fuel flow rate distribution calculation unit 105 calculates the fuel flow rate command value for the pilot system by multiplying the fuel flow rate command value CSO and the PLB ratio.

In the flow rate regulation valve control unit 106, the valve opening position computation unit 106b calculates the valve opening position command value for the pilot flow rate regulation valve 65 based on the fuel flow rate command value for the pilot system, the inlet pressure and the outlet pressure of the pilot flow rate regulation valve 65, the fuel density, and the fuel temperature.

Instant Load Decreasing Control

At the time of the instant load decreasing control, similar to the normal control, a bias value h2 for valve opening position adjustment is added to the PLB ratio calculated by the function 105c as a countermeasure for combustion vibration. A process similar to that of the normal control applies to successive processing.

Instant Load Decreasing Control in Case of Involving Abnormal Combustion

When abnormal combustion has occurred at the time of the instant load decreasing control, control of the foregoing "instant load decreasing control" is performed until the CSO is reduced to a predetermined target value (for example, the CSO corresponding to 35% of an output). When the CSO reaches the predetermined target value, a signal indicating that the CSO has reached the predetermined target value is input to the fuel flow rate distribution calculation unit 105 (in the diagram, "CSO HAS REACHED VALUE CORRESPONDING TO LOAD OF 35%"). Consequently, the fuel flow rate distribution calculation unit 105 switches the function used for calculating the PLB ratio from the function 105c to the function 105e. The function 105e calculates the PLB ratio for the CLCSO. Next, the fuel flow rate distribution calculation unit 105 calculates the PLB ratio by adding a bias h3 for valve opening position adjustment to the PLB ratio in order to cope with a shut off of the top hat system. The switcher 105d outputs the PLB ratio to which the bias h3 is added. Next, the fuel flow rate distribution calculation unit 105 calculates the fuel flow rate command value for the pilot system by multiplying the fuel flow rate command value CSO and the PLB ratio.

Similar to the normal control, the flow rate regulation valve control unit 106 calculates the valve opening position command value for the pilot flow rate regulation valve 65.

Here, the bias h2 and the bias h3 for valve opening position adjustment related to a pilot system will be described.

Correction with Respect to Combustion Vibration

Figure 11:
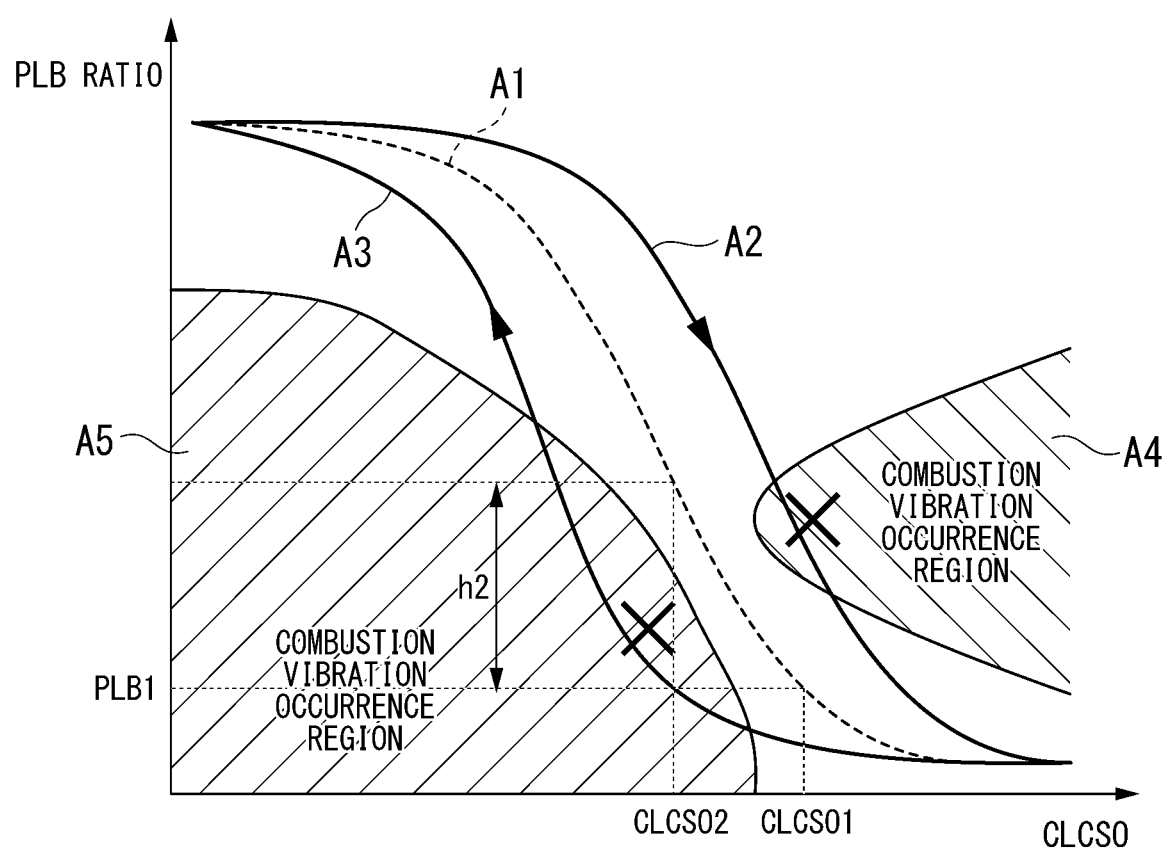
FIG. 11 is a view illustrating an example of a relationship between a fuel supply distribution ratio and a CLCSO when a load is changed.

FIG. 11 is a view illustrating an example of a relationship between a fuel supply distribution ratio and a CLCSO when a load is changed.

In FIG. 11, the vertical axis indicates the PLB ratio, and the horizontal axis indicates the CLCSO. FIG. 11 shows a relationship between the PLB ratio, the CLCSO, and combustion vibration. The region A4 and the region A5 are regions in which combustion vibration has occurred. The graph A1 indicates an operation line showing a relationship between the PLB ratio and the CLCSO with no occurrence of combustion vibration. The graph A2 is an example of an operation line at the time when a load is increased (when the CLCSO rises), and the operation line A3 is an example of an operation line at the time when a load is decreased. In both cases, there is a likelihood of occurrence of combustion vibration. There is a need for the fuel flow rate distribution calculation unit 105 to calculate the PLB ratio which can avoid the combustion vibration occurrence region as indicated in the graph A1. However, in the instant load decreasing control, an operation line as the graph A3 is likely to be exhibited.

When an output of the gas turbine 10 fluctuates, the inlet temperature of the turbine 21, that is, the value of the CLCSO also changes in accordance therewith. The fuel flow rate distribution calculation unit 105 calculates the inlet temperature of the turbine 21 based on an output of the gas turbine 10. However, when a load fluctuates rapidly, even if a relationship between the CLCSO (turbine inlet temperature) and the PLB ratio is a relationship in which no combustion vibration occurs (for example, a point on the graph A1), the CLCSO and the PLB ratio may have a relationship being actually included in the combustion vibration occurrence region at a certain point in time. For example, due to a valve operation delay, a pressure response delay caused by the influence or the like of the capacities of the flow rate adjustment valve (top hat flow rate regulation valve 67) of each of the fuel systems and a piping system to the nozzle, a combustion delay caused by fluctuation of the fuel flow rate, or the like, it takes time until the valve opening position for each of the fuel systems is actually operated and the flow rate of fuel supplied from each of the fuel systems becomes as the calculated distribution ratio after the fuel flow rate distribution calculation unit 105 calculates the distribution ratio such as the PLB ratio based on the CLCSO. On the other hand, the CLCSO (turbine inlet temperature) is calculated based on an output of the gas turbine 10, but an output of the gas turbine 10 during the instant load control decreases rapidly due to the foregoing control by the fuel flow rate command calculation unit 104. Then, the CLCSO is also reduced in accordance therewith. Consequently, the relationship between a PLB ratio "PLB1" calculated at a certain time based on that the value of the CLCSO is "CLCSO 1" and the value "CLCSO 2" of the CLCSO at the time at which the fuel flow rate supply based on the rate thereof is actually realized becomes the relationship of being included in the combustion vibration occurrence region. Therefore, during the instant load control, correction is performed by adding the bias h2 such that the relationship between the PLB ratio and the CLCSO (turbine inlet temperature) avoids the relationship having a high likelihood of occurrence of combustion vibration. As described using FIG. 9, regarding the TH ratio as well, the fuel flow rate distribution calculation unit 105 performs correction by adding the bias h1 such that the relationship between the TH ratio and the CLCSO avoids the relationship having a high likelihood of occurrence of combustion vibration.

Correction with Respect to Top Hat Shutoff

In the instant load decreasing control in a case of accompanying abnormal combustion, when the CSO reaches the target value, supply of fuel from the top hat nozzle 51 is shut off. As described above, processing of resetting the distribution ratio is performed between the pilot system and the main system at the same time as the top hat is shut off. However, due to the influence of a valve operation delay, a pressure response delay, a combustion delay, or the like, it takes time until the valve opening position actually becomes the distribution ratio after being reset, so that fuel supplied to the pilot system is reduced temporarily due to the influence of the shut off top hat system until the distribution ratio is reset. Consequently, there is concern that a flame of the pilot system may not be able to be retained and accidental fire may occur. Therefore, in order to avoid accidental fire, correction of adding the bias h3 for valve opening position adjustment for temporarily increasing fuel supplied to the pilot nozzle 44 is performed.

Next, a processing flow of the instant load decreasing control of the present embodiment will be described.

Figure 12:
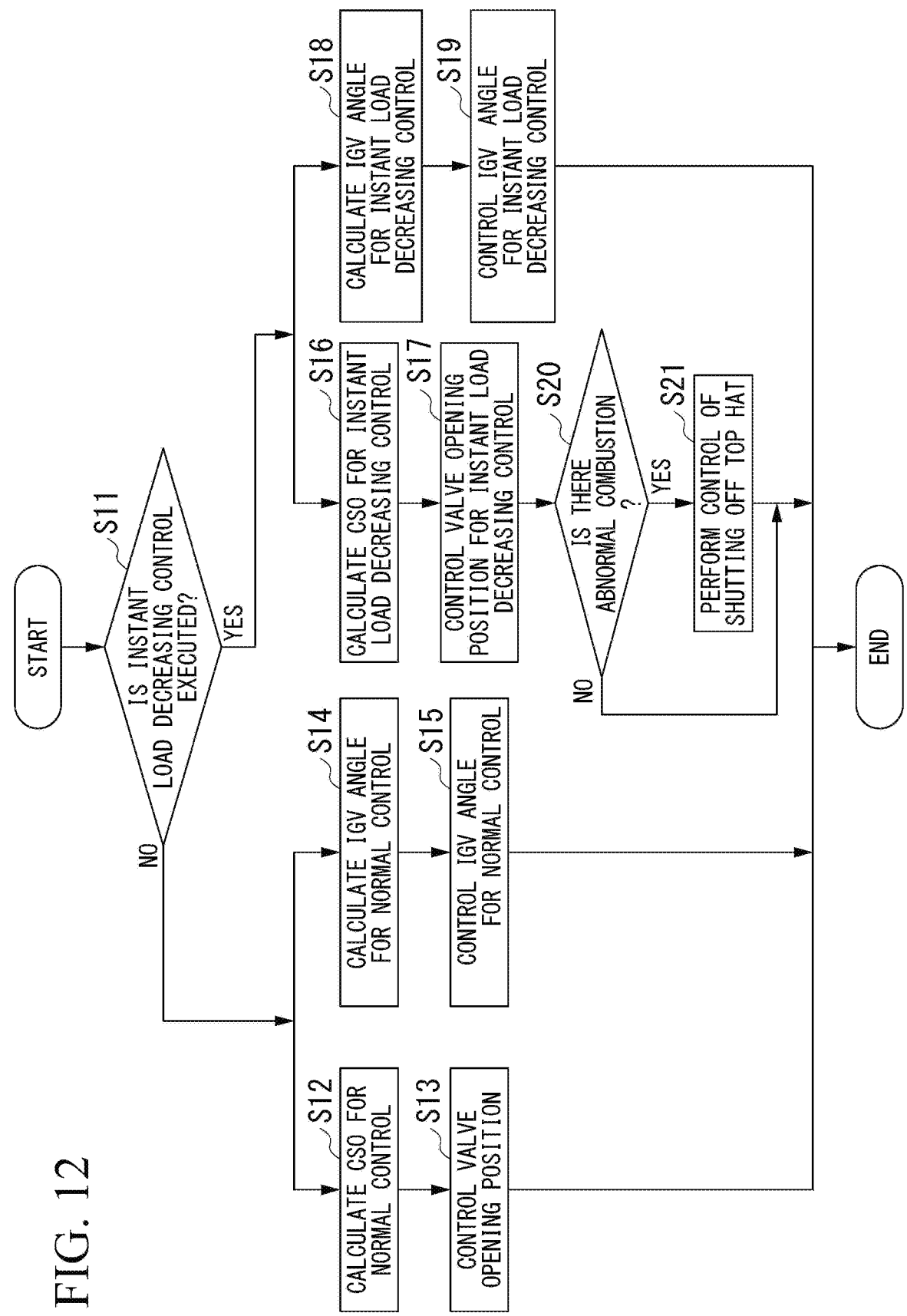
FIG. 12 is a flowchart showing an example of control in the embodiment according to the present invention.

FIG. 12 is a flowchart showing an example of control in the embodiment according to the present invention.

First, the fuel flow rate command calculation unit 104 and the IGV angle control unit 107 determine whether or not to execute the instant load decreasing control (Step S11). For example, if the input reception unit 101 acquires an instant load decreasing in-control signal or the abnormality detection unit 103 detects abnormal combustion, the fuel flow rate command calculation unit 104 and the like determine to execute the instant load decreasing control. Otherwise, the fuel flow rate command calculation unit 104 calculates the CSO for the normal control (Step S11; No). Specifically, as described using FIG. 7, the fuel flow rate command calculation unit 104 calculates the fuel flow rate command value CSO through control such as calculation of the LDCSO by performing feedback control based on the target output and an actual output of the gas turbine 10 (Step S12). Next, the fuel flow rate distribution calculation unit 105 calculates the fuel distribution ratio for the top hat system, the pilot system, and the main system based on the CSO, and the flow rate regulation valve control unit 106 controls the valve opening positions of the pilot flow rate regulation valve 65, the main flow rate regulation valve 66, and the top hat flow rate regulation valve 67 based on the distribution ratio for each thereof (Step S13). In parallel with Steps S12 and S13, the IGV angle control unit 107 calculates the IGV angle for the normal control (Step S14) and performs control of changing the opening degree of the IGV 14 at a normal change rate (Step S15). The processing described using FIG. 8 is performed in Steps S14 and S15.

On the other hand, when it is determined to execute the instant load decreasing control (Step S11; Yes), the fuel flow rate command calculation unit 104 calculates the CSO for the instant load decreasing control (Step S16). Specifically, as described using FIGS. 6 and 7, the fuel flow rate command calculation unit 104 calculates a CSO reduction rate corresponding to the atmospheric air and outputs a CSO corresponding to the reduction rate. Next, the fuel flow rate distribution calculation unit 105 and the flow rate regulation valve control unit 106 control the valve opening position for the instant load decreasing control (Step S17). Specifically, similar to the normal control, the fuel flow rate distribution calculation unit 105 calculates the fuel distribution ratio for the top hat system, the pilot system, and the main system. At this time, as described using FIGS. 9 and 10, the fuel flow rate distribution calculation unit 105 adds the bias h1 to the TH ratio and adds the bias h2 to the PLB ratio. The flow rate regulation valve control unit 106 controls the valve opening positions of the pilot flow rate regulation valve 65, the main flow rate regulation valve 66, and the top hat flow rate regulation valve 67.

In parallel with Steps S16 and S17, the IGV angle control unit 107 calculates the IGV angle for the instant load decreasing control (Step S18) and performs control of changing the opening degree of the IGV 14 at a change rate at the time of the instant load decreasing control (Step S19). The processing described using FIG. 8 is performed in Steps S18 and S19. The IGV angle control unit 107 starts to control the IGV angle substantially at the same time as the fuel flow rate command calculation unit 104 outputs the CSO for instant load decreasing control. The IGV angle control unit 107 closes the opening degree of the IGV 14 to the target opening degree during approximately the same time (2 to 5 seconds) as a time during which the CSO is reduced to the target value.

When the CSO is reduced to the predetermined target value through the processing of Steps S16 and S17, the fuel flow rate command calculation unit 104 outputs a signal indicating that the CSO has reached the predetermined target value to the fuel flow rate distribution calculation unit 105. The fuel flow rate distribution calculation unit 105 acquires a signal indicating that the CSO has reduced to the predetermined target value.

Consequently, the fuel flow rate distribution calculation unit 105 determines whether or not occurrence of abnormal combustion has been detected by the abnormality detection unit 103 at the time of starting the instant load decreasing control or currently (Step S20). When abnormal combustion has occurred (Step S20; Yes), the fuel flow rate distribution calculation unit 105 sets 0% for the TH ratio and updates the PLB ratio. The fuel flow rate distribution calculation unit 105 adds the bias h3 to the PLB ratio. The flow rate regulation valve control unit 106 shuts off fuel supply from the top hat nozzle 51 (Step S21) and adjusts the fuel supply amounts from the pilot nozzle 44 and the main nozzles 54 based on the new distribution ratio. When no abnormal combustion has occurred (Step S20; No), processing of Step S21 is not executed.

Figure 13:
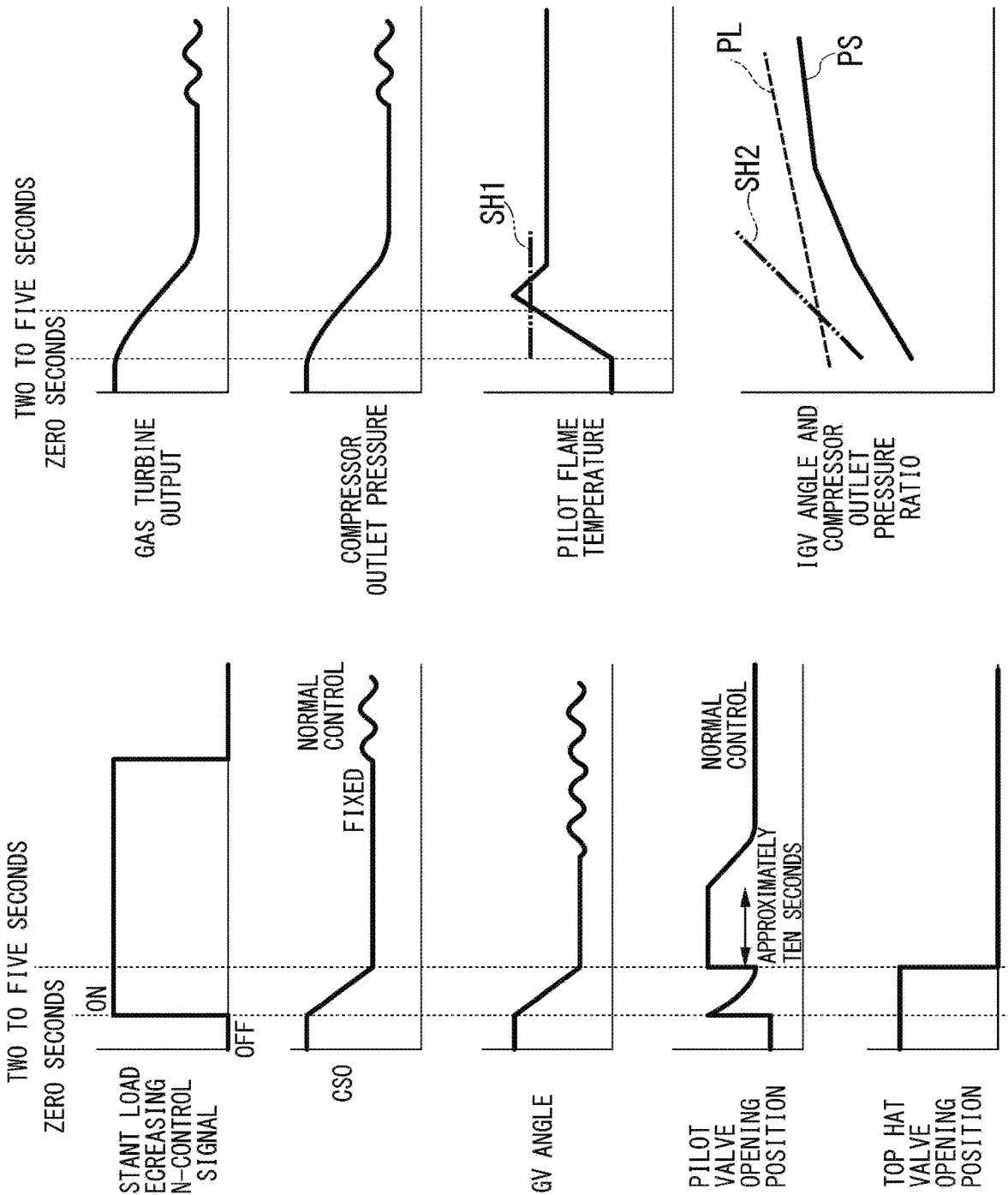
FIG. 13 shows timing charts of control values and state quantities when the control in the embodiment according to the present invention is executed.

FIG. 13 shows a change over time in control values and state quantities of the gas turbine 10 in the instant load decreasing control of the present embodiment. FIG. 13 shows timing charts of control values and state quantities when the control in the embodiment according to the present invention is executed.

In order from above on the left side, FIG. 13 shows timing charts of the respective control values regarding the presence or absence of an instant load decreasing in-control signal, the CSO, the opening degree of the IGV 14, the opening degree of the pilot flow rate regulation valve 65, and the opening degree of the top hat flow rate regulation valve

67. As described so far, the control device 100 reduces the CSO and the IGV angle to the target value and the target opening degree corresponding to the output after an instant load decrease during a predetermined time within 2 to 5 seconds from the start of the instant load decreasing control. The opening degree of the top hat flow rate regulation valve 67 after load reduction is set to zero, whereas the opening degree of the pilot flow rate regulation valve 65 is increased by approximately 10 seconds. Due to these steps of control, it is possible to obtain each of the state quantities in the timing charts on the right side.

In order from above on the right side, FIG. 13 shows the timing charts of the respective state quantities regarding the gas turbine output, the compressor outlet pressure, and the pilot flame temperature. The gas turbine output is reduced in accordance with reduction of the CSO and the IGV angle, and the compressor outlet pressure is gradually reduced as well. As a result, the pilot flame temperature reaches a threshold SH1, so that accidental fire is avoided. The ratio of the IGV angle and the compressor outlet pressure is indicated at the lowermost part in FIG. 13 on the right side. The ratio (graph PS) of the IGV angle and the compressor outlet pressure can avoid a surge in the compressor 11 without colliding with the surge region SH2.

As described above, when the fuel-air ratio diverges from the predetermined range, deterioration in environmental performance or a risk of accidental fire increases. For this reason, in the instant load decreasing control, the reduction times of the CSO and the IGV angle are caused to substantially coincide with each other. If the reduction time is excessively long, the time of abnormal combustion is lengthened, thereby causing instrument damage such as a nozzle burnout. On the other hand, if the reduction time is excessively short, a surge occurs in the compressor 11, thereby causing instrument damage. For comparison, a ratio of the IGV angle and the compressor outlet pressure when the CSO and the IGV angle are reduced at a higher rate is shown (graph PL). In this case, the IGV angle is reduced rapidly, whereas it takes time for reduction of the compressor outlet pressure. As a result, the ratio of the IGV angle and the compressor outlet pressure exhibits a progress as the graph PL and collides with the surge region SH2. As a result, a likelihood of occurrence of a surge in the compressor 11 increases. From the relationship between the control values and the state quantities, it has been confirmed that it is favorable to reduce the CSO and the IGV angle within approximately 2 to 5 seconds and approximately 35% of the rated load is most suitable for avoiding abnormal combustion or realizing stable combustion regarding the degree at the time of a load decrease.

Next, effects of the instant load decreasing control of the present embodiment will be described.

Figure 14:
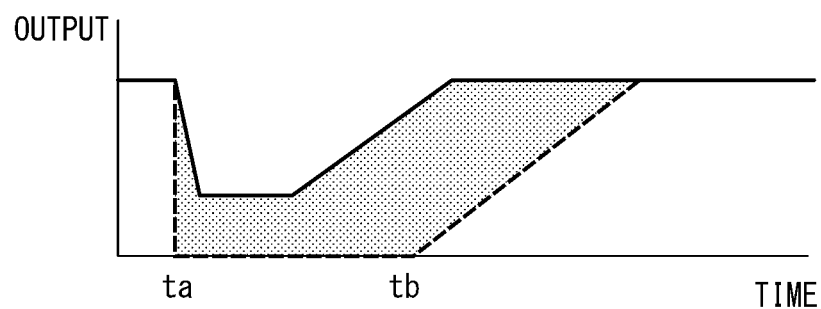
FIG. 14 is a view for describing effects of the control in the embodiment according to the present invention.

FIG. 14 is a view for describing effects of the control in the embodiment according to the present invention. In the related art, when abnormal combustion is detected, a load is shut off for instrument protection (graph of a dotted line). When a load is shut off, a power wholesaler may miss an opportunity for power generation during times to to tb. In contrast, the instant load decreasing control is performed instead of a load shutoff. Consequently, while a load of the gas turbine 10 is instantly decreased, operation can be stably continued. Accordingly, operation stop of the gas turbine 10 can be avoided (graph of a solid line), the plant operation rate can be improved, and missing an opportunity for power generation can be avoided.

Figure 15:
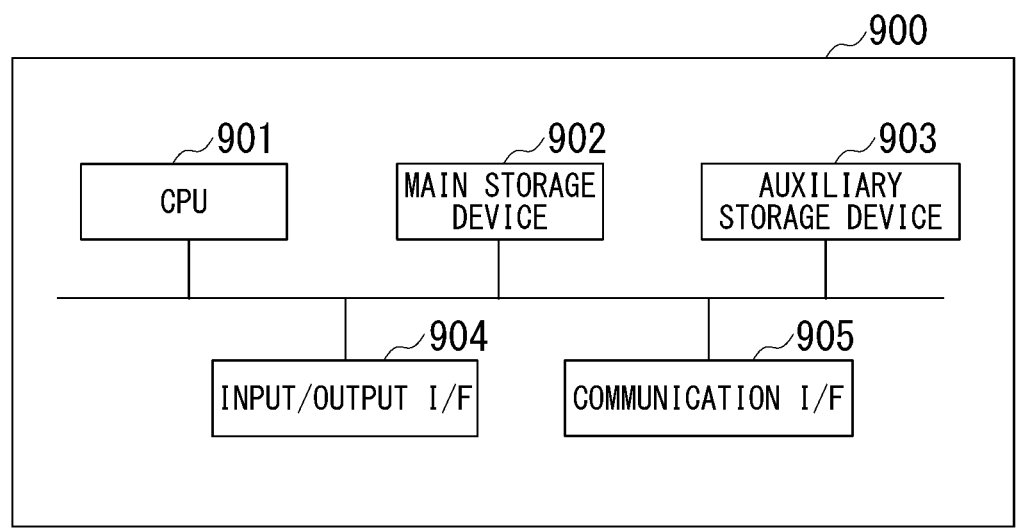
FIG. 15 is a view illustrating an example of a configuration of hardware of the control device in the embodiment of the present invention.

FIG. 15 is a view illustrating an example of a configuration of hardware of the control device in the embodiment of the present invention.

For example, a computer 900 is a personal computer (PC) or a server terminal device including a CPU 901, a main storage device 902, an auxiliary storage device 903, an input/output interface 904, and a communication interface 905. The control device 100 described above is mounted in the computer 900. Further, operation of each of the processing units described above is stored in the auxiliary storage device 903 in a form of a program. The CPU 901 reads out the program from the auxiliary storage device 903 and deploys it in the main storage device 902, thereby executing the foregoing processing in accordance with the program. In accordance with the program, the CPU 901 secures a storage region corresponding to the storage unit 108 in the main storage device 902. In accordance with the program, the CPU 901 secures a storage region for storing data being processed in the auxiliary storage device 903.

In at least one embodiment, the auxiliary storage device 903 is an example of a non-transitory physical medium. Alternative examples of a non-transitory physical medium include a magnetic disk, a magneto-optical disc, a CD-ROM, a DVD-ROM, and a semiconductor memory connected via the input/output interface 904. When this program is distributed to the computer 900 through a communication line, the computer 900 which has received the distribution may deploy the program in the main storage device 902 and execute the foregoing processing. The program may realize some of the functions described above. Moreover, the program may realize the functions described above in combination with another program which has already been stored in the auxiliary storage device 903, that is, the program may be a so-called differential file (differential program).

All or some of the input reception unit 101, the sensor information acquisition unit 102, the abnormality detection unit 103, the fuel flow rate command calculation unit 104, the fuel flow rate distribution calculation unit 105, the flow rate regulation valve control unit 106, and the IGV angle control unit 107 may be realized using hardware such as a microcomputer, a large scale integration (LSI), an application specific integrated circuit (ASIC), a programmable logic device (PLD), and a field-programmable gate array (FPGA).

Furthermore, the constituent elements in the foregoing embodiment can be suitably replaced with known constituent elements within a range not departing from the gist of the present invention. The technological scope of this invention is not limited to the foregoing embodiment, and various changes can be added within a range not departing from the gist of the present invention.

The fuel flow rate distribution calculation unit 105 is an example of a fuel distribution control unit and a second fuel distribution control unit. The IGV angle control unit 107 is an example of an air suction flow rate control unit. The predetermined time within a range of 2 to 5 seconds is an example of a first time and a second time. The top hat nozzle 51 is an example of a first nozzle, and the pilot nozzle 44 is an example of a second nozzle.

INDUSTRIAL APPLICABILITY

According to the control device, the gas turbine, the control method, and the program described above, a load can be reduced quickly while a surge in the compressor or

REFERENCE SIGNS LIST

10 Gas turbine
11 Compressor
14 IGV
21 Turbine
31 Combustor
33 Combustion cylinder (or tail cylinder)
43 Pilot burner
43a Pilot swirler
44 Pilot nozzle
51 Top hat nozzle
53 Main burner
54 Main nozzle
60 Fuel line
61 Pilot fuel line
62 Main fuel line
63 Top hat fuel line
65 Pilot flow rate regulation valve
66 Main flow rate regulation valve
67 Top hat flow rate regulation valve
71 Rotation frequency gauge
72 Output meter
73 Thermometer
74 Pressure gauge
75 Thermometer
76 Thermometer
100 Control device
101 Input reception unit
102 Sensor information acquisition unit
103 Abnormality detection unit
104 Fuel flow rate command calculation unit
104a PI controller
104b Switcher
105 Fuel flow rate distribution calculation unit
105b, 105d Switcher
105a, 105c, 105e Function
106 Flow rate regulation valve control unit
107 IGV angle control unit
107a, 107c Switcher
107b Function
107d Controller
108 Storage unit
900 Computer
901 CPU
902 Main storage device
903 Auxiliary storage device
904 Input/output interface
905 Communication interface

The invention claimed is:

1. A control device comprising:
a fuel flow rate command calculation unit configured to select and execute:
normal control including calculating a fuel flow rate command value through feedback control based on a deviation between a target output and an actual output of a gas turbine and
load decreasing control including creating a fuel reduction plan for reducing the fuel flow rate command value at a predetermined first rate to reduce the actual output of the gas turbine to a predetermined target output during a predetermined first time without performing feedback control, and calculating the fuel flow rate command value in accordance with the fuel reduction plan, wherein the predetermined first time is set to be longer than a time of two seconds below which a possibility of an occurrence of a surge in a compressor of the gas turbine increases and shorter than a time of five seconds above which a possibility of an occurrence of an instrument burnout in a combustor of the gas turbine increases from a time that load decreasing control is selected;
an air suction flow rate control unit configured to create an air suction flow rate reduction plan for reducing a flow rate of air flowing into the compressor of the gas turbine to a predetermined target flow rate at a predetermined second rate such that a fuel-air ratio settles within a predetermined range, in parallel with the load decreasing control executed by the fuel flow rate command calculation unit, and
wherein the control device is configured to, within the predetermined first time, perform control of the flow rate of air to the predetermined target flow rate in accordance with the air suction flow rate reduction plan and perform control of a flow rate of fuel of the gas turbine to the fuel flow rate command value in accordance with the fuel reduction plan without performing feedback control.

2. The control device according to claim 1, wherein when the load decreasing control is selected, the fuel flow rate command calculation unit changes the predetermined first rate, in accordance with an atmospheric air temperature.

3. The control device according to claim 1, wherein when the load decreasing control is selected, a difference between the predetermined first time and a predetermined second time taken until the flow rate of air flowing into the compressor is reduced to the predetermined target flow rate is equal to or smaller than a predetermined value.

4. The control device according to claim 3, wherein the predetermined second time is within a range of two seconds to five seconds.

5. The control device according to claim 1, wherein when the load decreasing control is selected, the predetermined first rate is such that the actual output of the gas turbine is reduced at a rate higher than 100% per minute.

6. The control device according to claim 1, wherein when the load decreasing control is selected, the predetermined first rate is such that the actual output of the gas turbine is reduced at a rate within a range of 800% per minute to 2,000% per minute.

7. The control device according to claim 1,
wherein when the load decreasing control is selected, the predetermined target output of the gas turbine is within a range of 30% to 40% of a rated output of the gas turbine.

8. The control device according to claim 1 further comprising:
an abnormality detection unit configured to detect an occurrence of an abnormal combustion, wherein the abnormality detection unit determines that the abnormal combustion has occurred when a temperature of the gas turbine fluctuates to an extent of a predetermined value or higher per unit time; and
a fuel distribution control unit configured to execute stop control of stopping fuel supply from a first nozzle, of a plurality of nozzles provided in the combustor, provided on a side furthest upstream at a timing when the fuel flow rate command value reaches a value corresponding to the predetermined target output when the occurrence of the abnormal combustion in the combustor during the load decreasing control is detected by the abnormality detection unit, and to execute distribution switch control of switching a fuel supply distribution ratio between the remaining nozzles excluding the first nozzle to a distribution ratio after the stop control.

9. The control device according to claim 8, wherein the fuel distribution control unit performs correction of compensating for a fuel supply amount which has dropped temporarily due to stop of fuel supply from the first nozzle regarding the fuel supply distribution ratio for the nozzles, of the remaining nozzles excluding the first nozzle, for forming a premixed flame for retaining a premixed combustion flame formed by the combustor.

10. The control device according to claim 8, further comprising:
a second fuel distribution control unit configured to perform correction of a fuel distribution ratio for a second nozzle of the plurality of nozzles provided in the combustor to avoid a relationship between a combustion load command value corresponding to a load at one time during the load decreasing control and the fuel distribution ratio for the second nozzle at the one time becoming a relationship having a high likelihood of occurrence of combustion vibration regarding the fuel distribution ratio for the second nozzle related to combustion vibration.

11. A gas turbine comprising:
the control device according to claim 1;
the compressor;
the combustor; and
a turbine.

12. A control method comprising:
selecting and executing normal control of calculating a fuel flow rate command value through feedback control based on a deviation between a target output and an actual output of a gas turbine;
selecting and executing load decreasing control of creating a fuel reduction plan for reducing the fuel flow rate command value at a predetermined first rate to reduce the actual output of the gas turbine to a predetermined target output during a predetermined first time without performing feedback control, and calculating the fuel flow rate command value in accordance with the fuel reduction plan, wherein the predetermined first time is set to be longer than a time of two seconds below which a possibility of an occurrence of a surge in a compressor of the gas turbine increases and shorter than a time of five seconds above which a possibility of an occurrence of an instrument burnout in a combustor of the gas turbine increases from a time that load decreasing control is selected;
creating an air suction flow rate reduction plan for reducing a flow rate of air flowing into the compressor of the gas turbine to a predetermined target flow rate at a predetermined second rate such that a fuel-air ratio settles within a predetermined range, in parallel with execution of the load decreasing control; and
performing, within the predetermined first time, control of the flow rate of air to the predetermined target flow rate in accordance with the air suction flow rate reduction plan and control of a flow rate of fuel of the gas turbine to the fuel flow rate command value in accordance with the fuel reduction plan without performing feedback control.

13. A non-transitory computer-readable storage medium storing a program, wherein when executed by a computer the program causes the computer to perform operations including:
selecting and executing normal control of calculating a fuel flow rate command value through feedback control based on a deviation between a target output and an actual output of a gas turbine;
selecting and executing load decreasing control of creating a fuel reduction plan for reducing the fuel flow rate command value at a predetermined first rate to reduce the actual output of the gas turbine to a predetermined target output during a predetermined first time without performing feedback control, and calculating the fuel flow rate command value in accordance with the fuel reduction plan, wherein the predetermined first time is set to be longer than a time of two seconds below which a possibility of an occurrence of a surge in a compressor of the gas turbine increases and shorter than a time of five seconds above which a possibility of an occurrence of an instrument burnout in a combustor of the gas turbine increases from a time that load decreasing control is selected;
creating an air suction flow rate reduction plan for reducing a flow rate of air flowing into the compressor of the gas turbine to a predetermined target flow rate at a predetermined second rate such that a fuel-air ratio settles within a predetermined range, in parallel with execution of the load decreasing control; and
performing, within the predetermined first time, control of the flow rate of air to the predetermined target flow rate in accordance with the air suction flow rate reduction plan and control of a flow rate of fuel of the gas turbine to the fuel flow rate command value in accordance with the fuel reduction plan without performing feedback control.

* * * * *